United States Patent [19]

Sakamoto et al.

[11] Patent Number: 5,301,103
[45] Date of Patent: * Apr. 5, 1994

[54] METHOD AND SYSTEM FOR RESTARTING SEQUENTIALLY CONTROLLED EQUIPMENT INSTALLED IN A PRODUCTION LINE

[75] Inventors: Shunji Sakamoto, Higashi Hiroshima; Toshihiko Hoshino, Hiroshima, both of Japan

[73] Assignee: Mazda Motor Corporation, Hiroshima, Japan

[*] Notice: The portion of the term of this patent subsequent to Sep. 15, 2009 has been disclaimed.

[21] Appl. No.: 498,742

[22] Filed: Mar. 26, 1990

[30] Foreign Application Priority Data

| Mar. 25, 1989 | [JP] | Japan | 1-72247 |
| Sep. 29, 1989 | [JP] | Japan | 1-253989 |
| Sep. 29, 1989 | [JP] | Japan | 1-253990 |
| Feb. 9, 1990 | [JP] | Japan | 2-30378 |

[51] Int. Cl.⁵ .............................. G06F 15/46
[52] U.S. Cl. ........................ 364/184; 364/143; 364/468
[58] Field of Search ............... 364/184–187, 364/468, 469, 474.11, 140, 147, 143, 141; 318/563, 565, 567–569

[56] References Cited

U.S. PATENT DOCUMENTS

| 4,638,227 | 1/1987 | Katayama et al. | 364/184 |
| 4,947,349 | 8/1990 | Munenaga et al. | 364/184 |
| 5,111,383 | 5/1992 | Kimura et al. | 364/184 |
| 5,148,363 | 9/1992 | Sakamoto et al. | 364/468 |

FOREIGN PATENT DOCUMENTS 63-254501 10/1988 Japan.
63-257054 10/1988 Japan.

Primary Examiner—Jerry Smith
Assistant Examiner—Thomas E. Brown
Attorney, Agent, or Firm—Wenderoth, Lind & Ponack

[57] ABSTRACT

In a method and a system for restarting sequentially controlled equipment installed in a production line when the equipment is out of order, operations of the equipment are divided into a plurality of operation blocks, operations of each of which are executed independently of those in any other block. Each of the operation blocks are further divided into one or a series of operation steps to be sequentially executed in a predetermined order under a normal condition. At least one home position from which the equipment can be restarted is set in each operation block. An output element which has caused failure and is now stopped is restored to the home position after a cause of failure is removed.

11 Claims, 26 Drawing Sheets

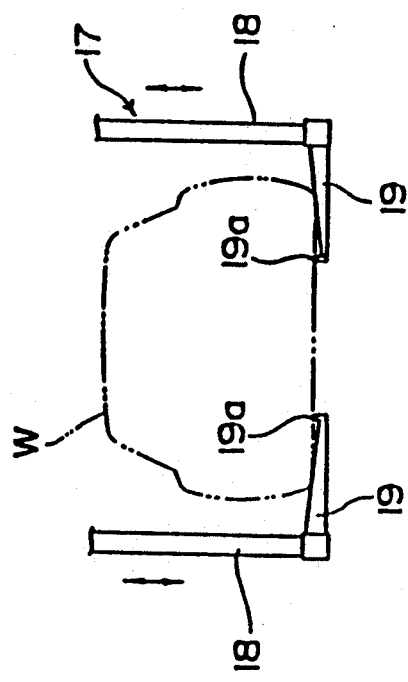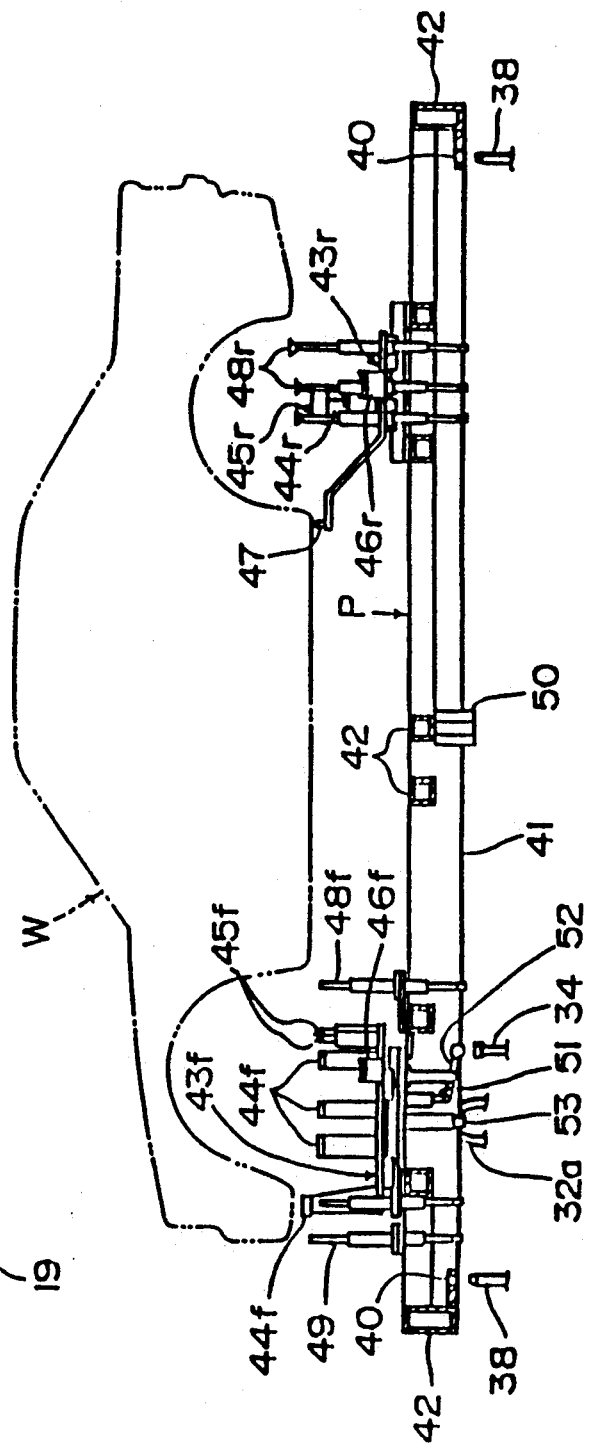

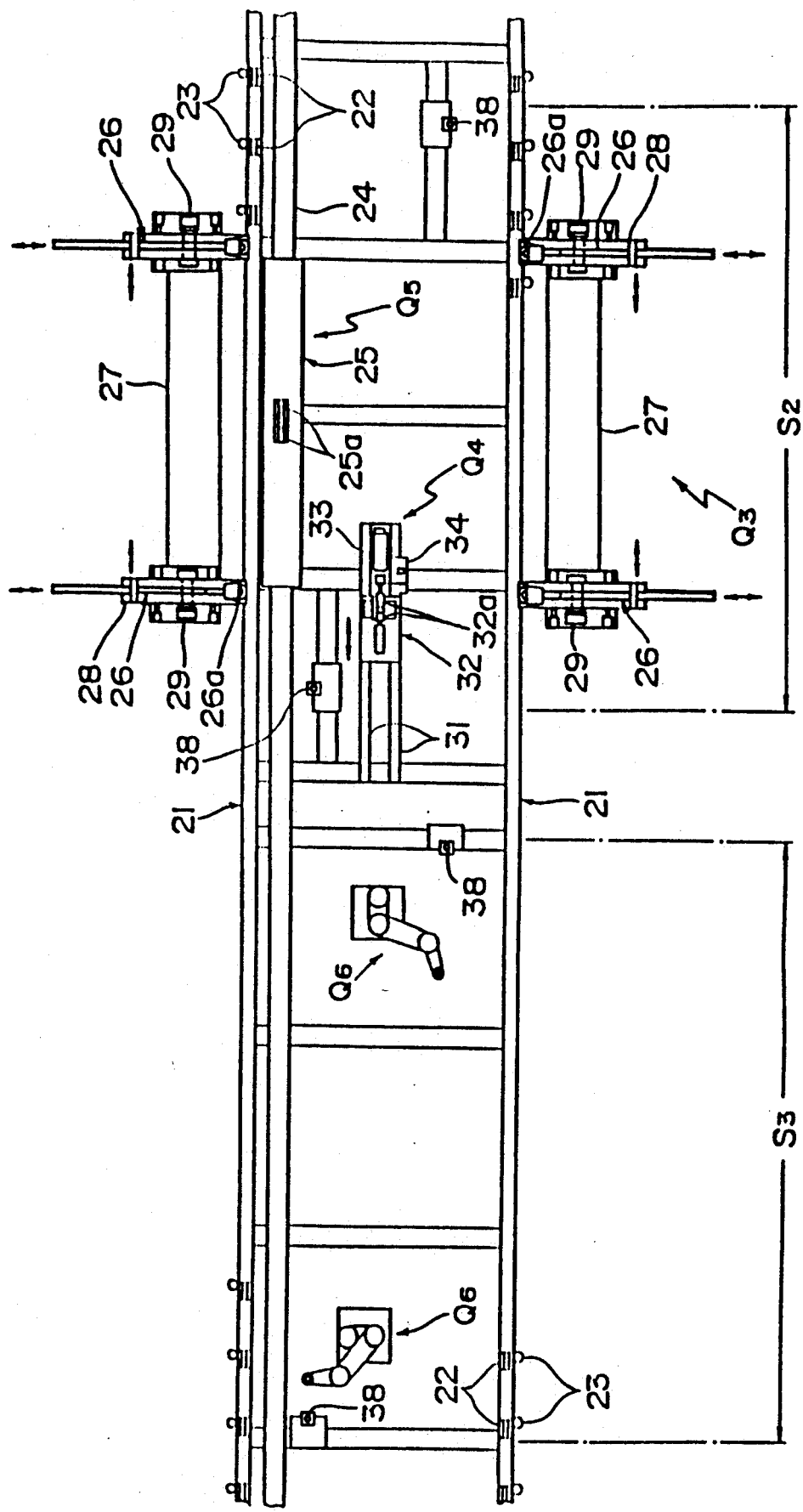

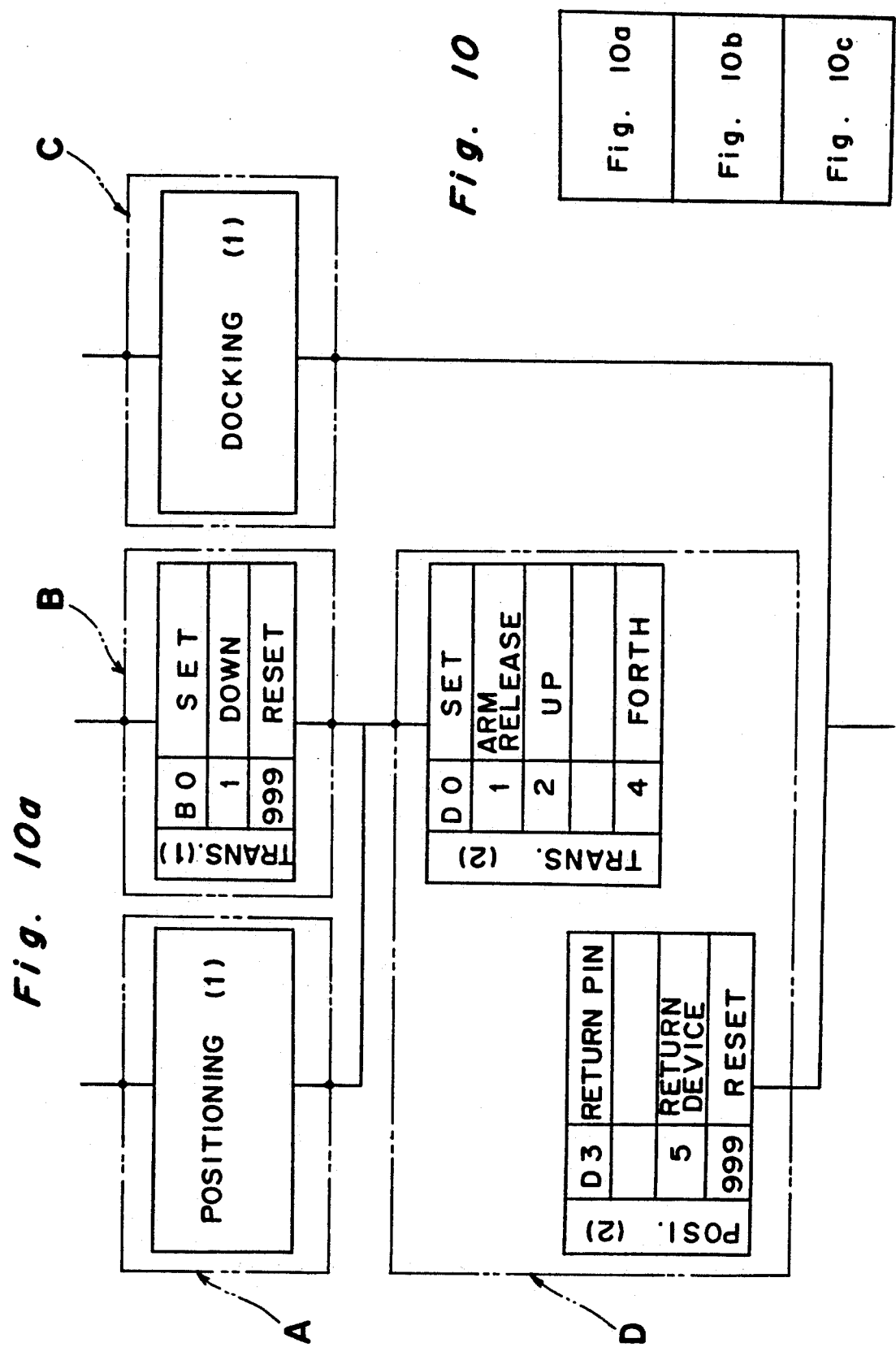

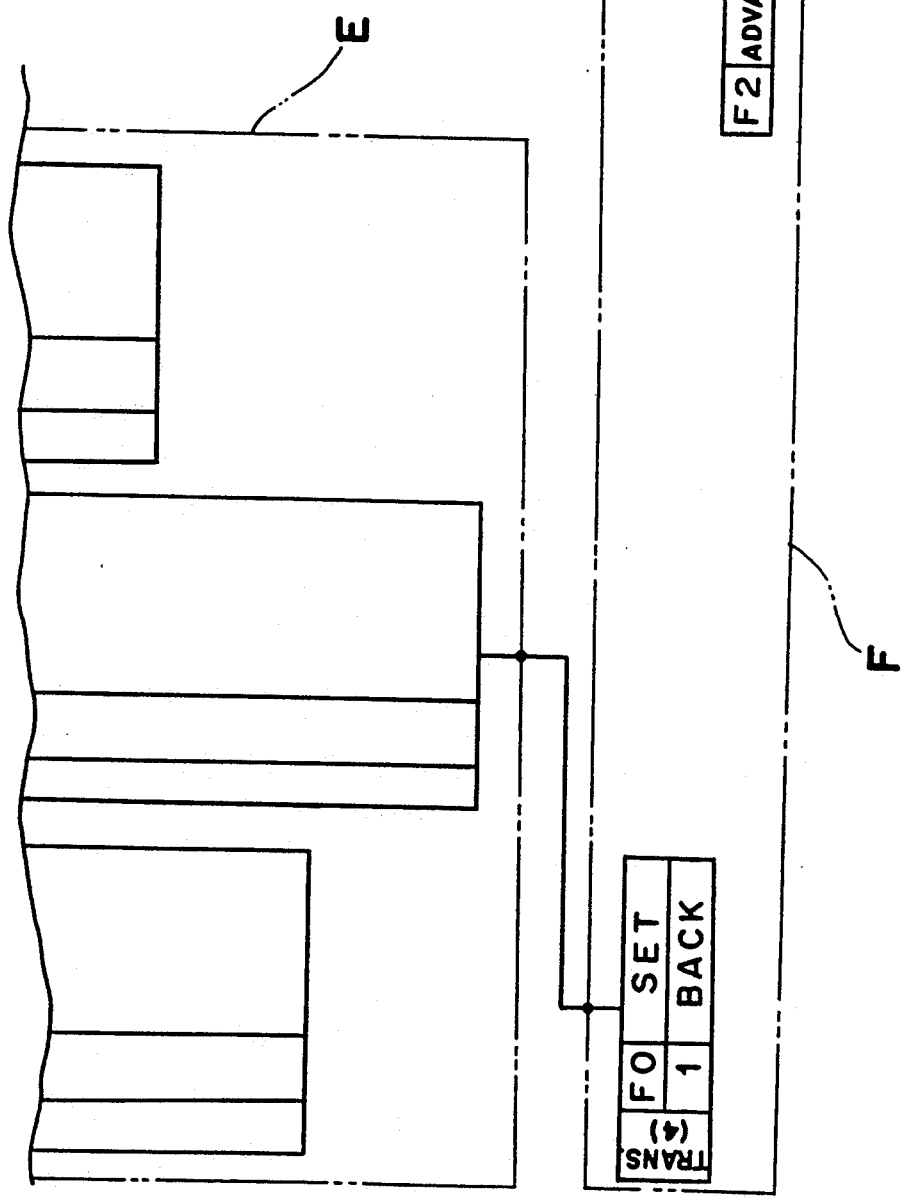

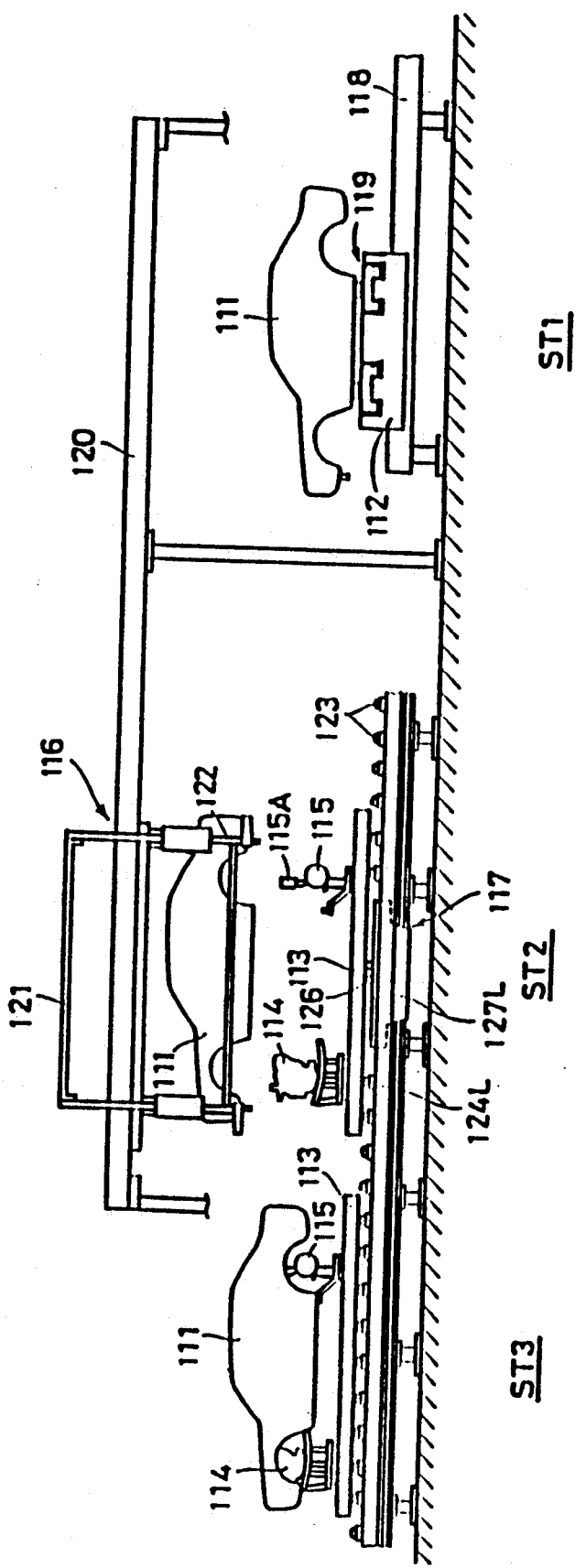

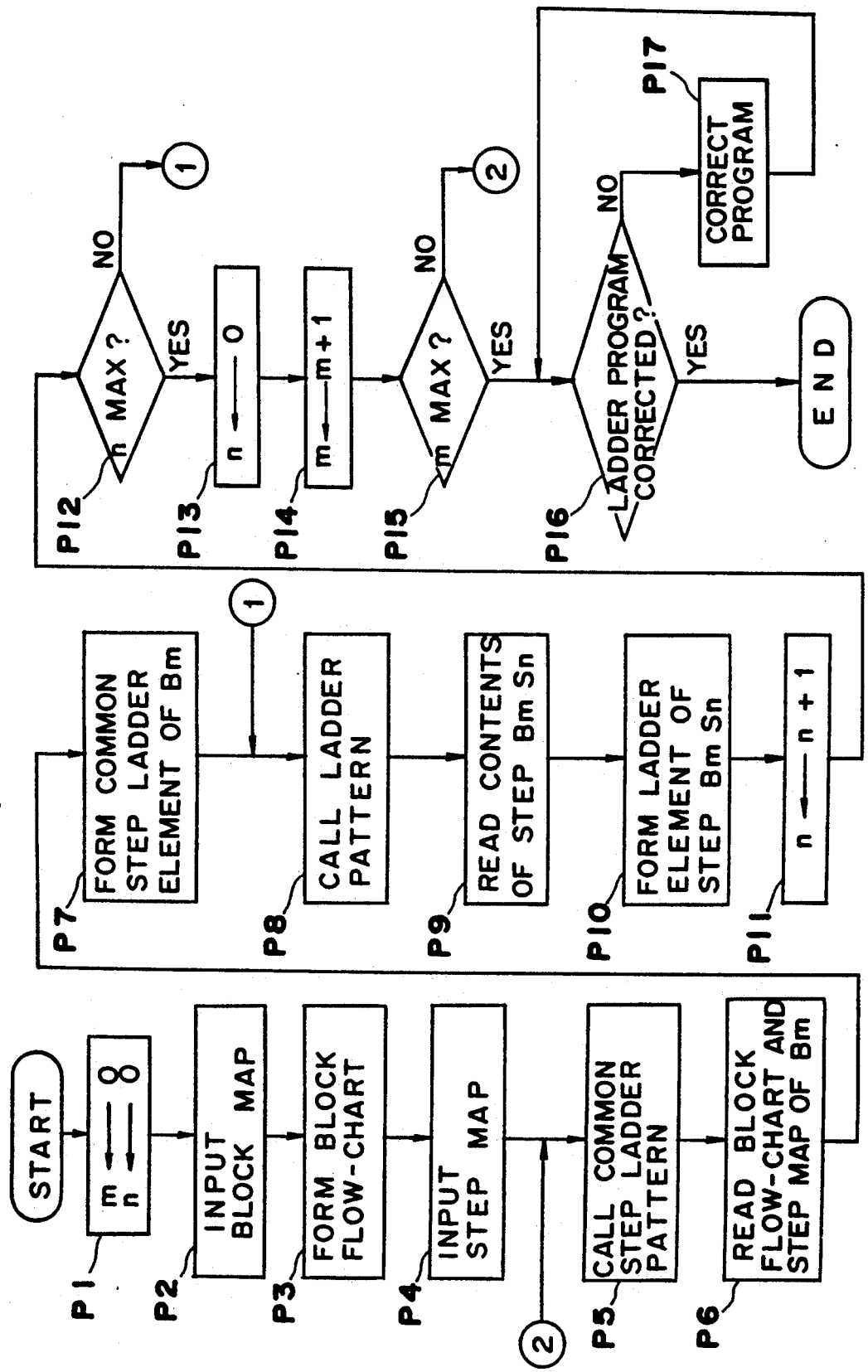

METHOD AND SYSTEM FOR RESTARTING SEQUENTIALLY CONTROLLED EQUIPMENT INSTALLED IN A PRODUCTION LINE

BACKGROUND OF THE INVENTION

1. Field of the Invention

The present invention relates to a method of restarting sequentially controlled equipment installed in a production line when the equipment is out of order. The equipment is restored to the normal condition after the cause of a failure is removed. The present invention also relates to a system for effecting such a method.

2. Description of the Related Art

According to a known sequential program control, each step of the control is sequentially executed according to the program which specifies the order for operating each output element, for example an actuator, constituting the operation system of equipment. An apparatus for monitoring whether or not the sequential program control is in order is proposed in, for example, Japanese Laid-Open Patent Publication No. 60-238906. According to this disclosure, operation patterns of elements constituting a sequential control circuit which can appropriately operate the equipment are initially stored in a memory. It is sequentially checked whether or not the operation patterns of the elements in operation coincide with those stored in the memory. If both of them do not coincide with each other, it is judged that the operation system has caused a failure.

In the event of a failure of the operation system of the sequentially controlled equipment, the operation of the equipment is suspended. In order to automatically restart the equipment after a defective portion is restored to the normal condition, it is necessary to manually return all output elements constituting the operation system to respective restorable operation steps, i.e., the so-called home positions, at which the output elements are capable of restarting without interfering with one another.

However, the home positions of all the output elements are generally set only to respective operation steps corresponding to the initial condition of the equipment. Therefore, when the failure occurs in the equipment at a certain later operation step in sequential operation steps, it takes a long time to return each output element to the home position (initial condition) thereof. Thus, much time is wasted before the equipment restarts operation.

SUMMARY OF THE INVENTION

It is, therefore, an object of the present invention to provide a method of restarting an operation system of sequentially controlled equipment installed in a production line, which is capable of restoring each output element to one of a plurality of home positions thereof in a short period of time when the operation system is automatically restarted after the cause of failure is removed.

Another object of the present invention is to provide a system for effecting the above-described method, which can be speedily manipulated with ease.

To accomplish these and other objects, a method according to the present invention comprises the steps of:

(a) dividing operations of the equipment into a plurality of operation blocks, operations in each operation block being executed independently of operations in any other block;

(b) dividing each of the operation blocks into one or a series of operation steps to be sequentially executed in a predetermined order under a normal condition;

(c) setting in each operation block at least one home position from which the equipment can be restarted; and (d) restoring an output element which has caused a failure and is now stopped, to the home position after a cause of failure is removed.

Furthermore, a system for effecting such a method includes a fault operation block specifying means, control element specifying means, control element displaying means, operation step advancing means, and restarting means.

When an operation element which has caused a failure is restored to the normal condition, the fault operation block specifying means specifies, as a fault operation block, an operation block including a fault operation step which is stopped without reaching a restorable operation step from which the equipment can be restarted. The control element specifying means specifies operation elements to be operated, which correspond to steps from the stopped operation step to the restorable operation step so that these steps may be successively advanced. The control element specifying means further specifies control elements to be manipulated to operate the specified operation elements. The control element displaying means displays each control element specified by the control element specifying means in an operable condition. Upon manipulation of such control elements, the control element specifying means causes the specified operation elements to be operated. The operation step advancing means successively advances the steps from the fault operation step to the restorable operation step, whenever the operation elements are operated so that the fault operation block may reach the restorable step. The restarting means restarts the sequence control with respect to the equipment when the fault operation block reaches the restorable operation step.

According to the present invention, a series of operation steps are divided into a plurality of operation blocks, each of which is independent of any other operation block in operation without interfering with each other. The first and last operation steps in each operation block are set as home positions, and an operation system of the equipment is returned to one of the home positions when the operation system is restarted.

Accordingly, the method and the system according to the present invention can shorten the period of time required to return the operation system of the equipment to the home position and can quickly restart the operation system after the cause of failure is removed, as compared with the conventional operation methods or systems, in which the home position is generally set only to an initial condition of the equipment.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein:

FIG. 2 is a side elevational view of vehicle body holding arms of a carrier mounted in the assembling apparatus of FIG. 1;

FIG. 3 is a plan view of a docking station and a clamping station provided in the assembling apparatus of FIG. 1;

FIG. 5 a schematic front view of the pallet of FIG. 4;

FIGS. 18 and 19 are views similar to FIGS. 1 and 3, respectively, which indicate another assembling apparatus to which the present invention is applied;

FIG. 22 is a flow-chart showing the procedure for forming the sequence control program formed by the programming device of FIG. 20;

DETAILED DESCRIPTION OF THE PREFERRED EMBODIMENTS OF THE PRESENT INVENTION

Figure 1:
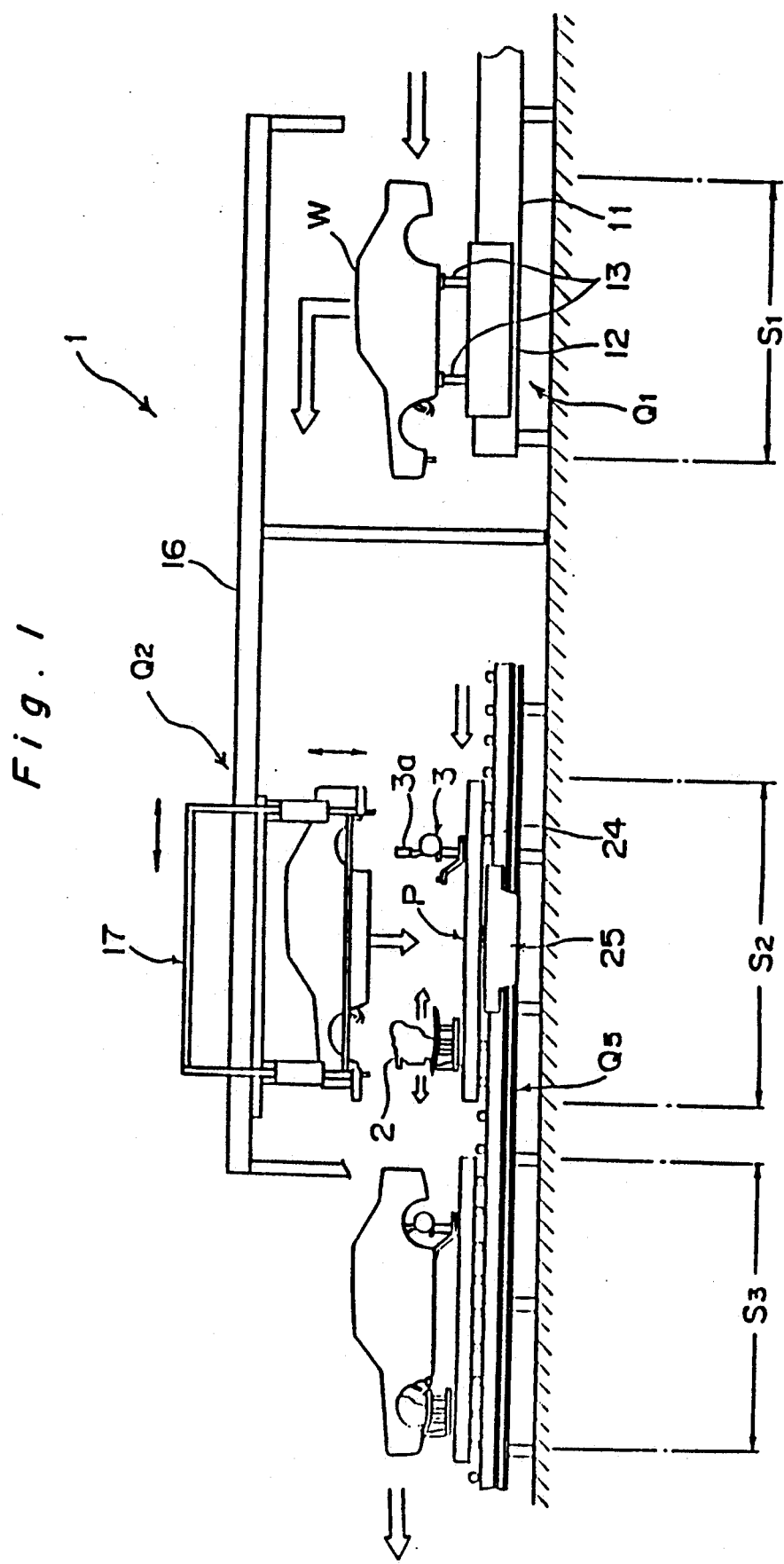
FIG. 1 is a schematic front view showing the entire construction of an assembling apparatus, to which the present invention is applied, for assembling automobile vehicles.

Referring now to the drawings, there is shown in FIG. 1 an assembling apparatus 1, to which the present invention is applied, for assembling suspensions, an engine and the like on an automobile vehicle body.

As shown in FIG. 1, the assembling apparatus 1 comprises a positioning station S1 for receiving a vehicle body W (hereinafter referred to as body) transported from a preceding device and for appropriately positioning the body W; a docking station S2 for assembling on the body W an engine 2 placed on a predetermined position on a pallet P, front and rear suspensions 3 (only the rear side is shown in FIG. 1); and a clamping station S3 for clamping with screws the engine 2 and the front and rear suspensions 3 to the body W after the engine 2 and the front and rear suspensions 3 are combined with the body W. An overhead transfer device Q2 for transferring the body W travels between the positioning station S1 and the docking station S2 while suspending the body W. A pallet transporting device Q5 for transporting the pallet 13 travels between the docking station S2 and the clamping station S3.

The positioning station S1 comprises a movable base 12 which reciprocably travels along a rail 11 so that the body W supplied from the preceding device is placed on the transfer device Q2 at a predetermined position thereof. The movable base 12 is provided with a plurality of vertically movable body receiving members 13 for supporting the lower section of the body W. Although not shown in FIG. 1, the positioning station S1 further comprises a lengthwise positioning means for positioning the movable base 12 at a predetermined place in the longitudinal direction thereof i.e., in the longitudinal direction of the body W; vertically positioning means for positioning the body receiving members 13 at respective predetermined places in the vertical direction thereof; and a positioning device Q1 comprising reference pins for positioning the body on the movable base 12.

The transfer device Q2 comprises a guide rail 16 extending above the positioning station S1 and the docking station S2 and a carrier 17 which reciprocably travels along the guide rail 16 while suspending the body W. As shown in FIG. 2, the carrier 17 comprises paired hanger frames 18 to be operated to vertically move the body W and body holding arms 19 pivotally mounted on the lower ends of the hanger frames 18. The body holding arms 19 are pivoted by an air cylinder (not shown) and have respective pins 19a which are engageable with the body W.

As shown in FIG. 3, the pallet transporting device Q5 which travels between the docking station S2 and the clamping station S3 comprises a pair of guide sections 21 having a plurality of supporting rollers 22 for receiving the left and right lower end surfaces of the pallet P and a plurality of side rollers 23 for guiding the left and right side faces of the pallet P; a pair of transporting rails 24 extending in parallel with both guide rails 21 and 21; a pallet transporting base 25 provided to move along the transporting rail 24 and having a pallet locking portion 25a for locking the pallet P.

Although not shown, the guide sections 21 and 21 and the transporting rail 24 form a loop. That is, in the loop, after the engine 2 and the suspensions 3 are supplied from a parts supplying station (not shown) to the assembling apparatus 1, the body W is transported to the docking station S2 of the assembling apparatus 1 and the clamping station S3. After the engine 2 and the suspensions 3 are clamped to the body W, the body W is transported to a transporting station (not shown) for transporting the body W to the next process. Then, the body W is returned to the parts supplying station. A plurality of pallet transporting bases 25 arranged on the transporting rails 24 travel at respective predetermined cycles.

The docking station S2 comprises a pair of clamp arms 26 for clamping the front and rear suspensions 3 mounted at positions corresponding to the positions for clamping the front suspension and rear suspension 3. The clamp arms 26 are positioned outside the guide sections 21 so that they are opposed to each other with the guide sections 21 extending therebetween. The clamp arms 26 make damper units 3a (refer to FIG. 1) unmovable until the damper units 3a are mounted on the body W when the rear suspension 3 is mounted on the body W. Each of the clamp arms 26 has, at the top end thereof, a claw 26a for clamping the damper unit 3a and is mounted on each of the mounting bases 27 positioned outside the guide sections 21 through a mounting plate 28 so that the clamp arms 26 can move in the widthwise direction of the body W. Each mounting plate 28 is provided with an arm slide 29 comprising an air cylinder 29 so as to slide the mounting plate 28 lengthwise. The arm slide 29 is movable widthwise and lengthwise with the damper unit 3a clamped by the clamp arm 26. That is, a docking device Q3 for docking the engine 2 and the suspensions 3 with the body 3 comprises the clamp arms 26 and the arm slides 29.

The docking device S2 comprises a pair of left and right slide rails 31 positioned in parallel with the guide sections 21 of the pallet transporting device Q5; a movable member 32 which slides lengthwise along the slide rails 31; and a slide device Q4 comprising an electric motor 33 for driving the movable member 32. As described later, when the engine 2 is mounted on the body W, the body W and the engine 2 do not interfere with each other by the slide device Q4 which vertically moves the engine 2 placed on the pallet P.

The clamping station S3 includes a plurality of robots Q6 for clamping the engine 2 and the suspensions 3 to the body W and a plurality of vertically movable pallet positioning pins 38 for positioning the pallet P at a predetermined position so as to lock the pallet P. The docking station S2 has also a plurality of pallet positioning pins 38 similar to those of the clamping station S3.

Figure 4:
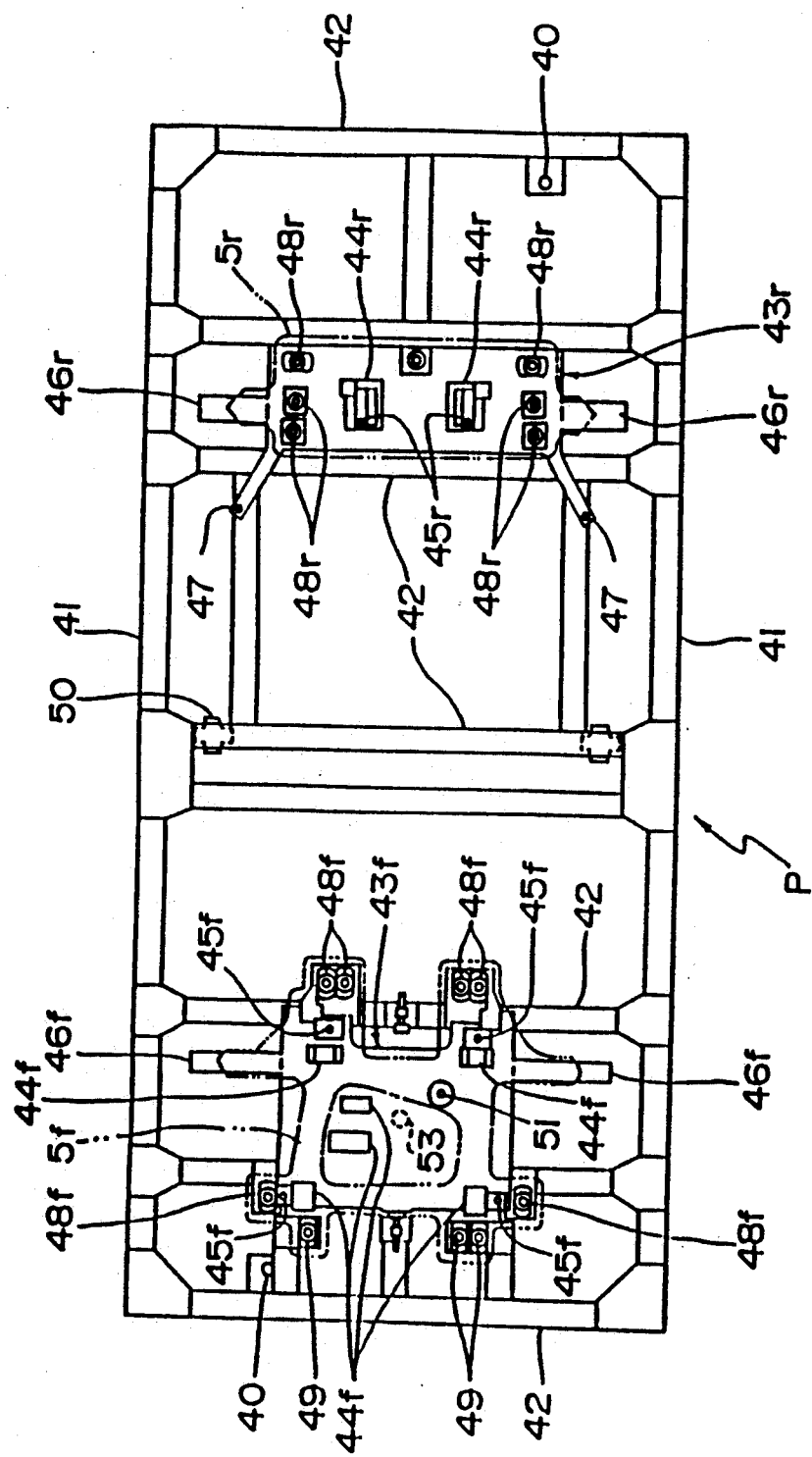
FIG. 4 is a plan view of a pallet provided in the assembling apparatus of FIG. 1.

As shown in FIG. 4, the pallet P comprises a pair of frames 41 extending lengthwise and a plurality of frames 42 spanned between the frames 41 like a ladder. The pallet P has, in the vicinity of the front and rear ends thereof, a plurality of openings 40 for receiving the pallet positioning pins 38 and has, in the vicinity of both sides of the center in the lengthwise direction thereof, stoppers 50 to be locked by a locking portion 25a of the pallet transporting base 25.

The pallet P has, in the front thereof, a front supporting base plate 43f for supporting a base frame 5f positioned on the front thereof on which the engine 2 and the front suspension (not shown) are placed. The pallet P further has, in the rear thereof, a rear supporting base plate 43r for supporting a base frame 5r positioned in the rear thereof on which the rear suspension 3 is placed. As shown in FIG. 5, the front and rear supporting base plates 43f and 43r are provided with a plurality of respective supporting members 44f and 44r for supporting the base frames 5f and 5r or the body W, a plurality of respective positioning pins 45f and 45r for positioning the base frames 5f and 5r on the supporting base plates 43f and 43r, and respective body receiving members 46f and 46r for supporting the body W through brackets. The rear supporting base plate 43r is provided with a plurality of body positioning pins 47 for positioning the body W on the pallet P and a plurality of nut holders 48r for holding nuts to be used to clamp the body W in the clamping station S3.

The pallet P has, in the front side thereof, nut holders 48f similar to those of the rear side thereof and bolt holders 49 each attached thereto. The pallet P has also lock pins 51 for locking the front supporting base plate 43f at the predetermined position thereof. The position of each lock pin 51 is varied to lock or unlock the front supporting base plate 43f. That is, a spring (not shown) urges the lock pin 51 toward the locking position and a release lever 52 moves it to the unlocking position. The front supporting base plate 43f is integrated with a locking member 53 extending downward therefrom. The locking member 53 is locked by the claw 32a (refer to FIG. 3) mounted on the upper surface of the movable body 32 of the slide device Q4. The slide device Q4 includes an air cylinder 34 for releasing the release lever 52. When the body W is moved downward toward the docking station S2, the release lever 52 is operated to release the lock pin 51 from the front supporting base plate 43f and the slide device Q4 vertically moves the front supporting base plate 43f, namely, the engine 2 through the locking member 53. Thus, the engine 2 and the body W do no interfere with each other.

As described above, the assembling apparatus 1 includes, as the principal output elements constituting an operation system, the positioning device Q1, the transfer device Q2, the docking device Q3, the slide device Q4, the pallet transporting device Q5, and the screwing robots Q6. These output elements are sequentially controlled by a certain program.

According to the above-described embodiment, various operations to be performed by equipment installed in the production line are divided into a plurality of operation groups. The operations in one operation group are carried out independently of those of any other operation groups from beginning to end under the normal conditions. Each of the operation groups is further divided into a plurality of operation blocks. The operations in one operation block are carried out independently of those of any other operation blocks under the normal conditions. Further, each of the operation blocks is divided into a plurality of operation steps. The operation steps in each operation block are sequentially carried out in the predetermined order.

The fundamental concepts of the operation group, the operation block, and the operation step according to the present invention will be discussed hereinafter.

Figure 6:
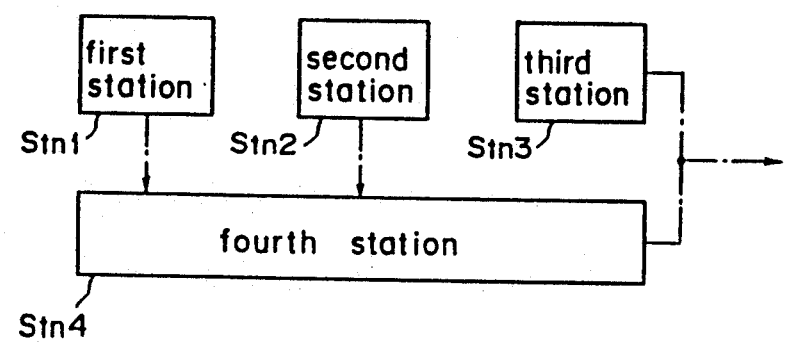
FIG. 6 is a schematic diagram of a certain production line for explaining the fundamental concept of an operation group, an operation block, and an operation step constituting an operation system of the production line.

FIG. 6 schematically depicts one example of a production line provided with a continuous conveyor line and a plurality of linear transporting lines. Each linear transporting line receives and transports parts, products or the like with respect to the continuous conveyor line by the use of, for example, a tact transporting system. Each transporting line constitutes an independent station. As shown in FIG. 6, the first and second stations Stn1 and Stn2 transport parts or products to the fourth station Stn4 of the continuous conveyor line. The third station Stn3 transports the parts or products to the next station (not shown) in synchronism with the timing at which the parts or products are delivered from the fourth station Stn4. If the operations to be performed at the first and second stations Stn1 and Stn2 are normal, the fourth station Stn4 is operable. If the operations to be performed at the fourth station Stn4 and the third station Stn3 are normal, the next station (not shown) is operable.

Figure 7:
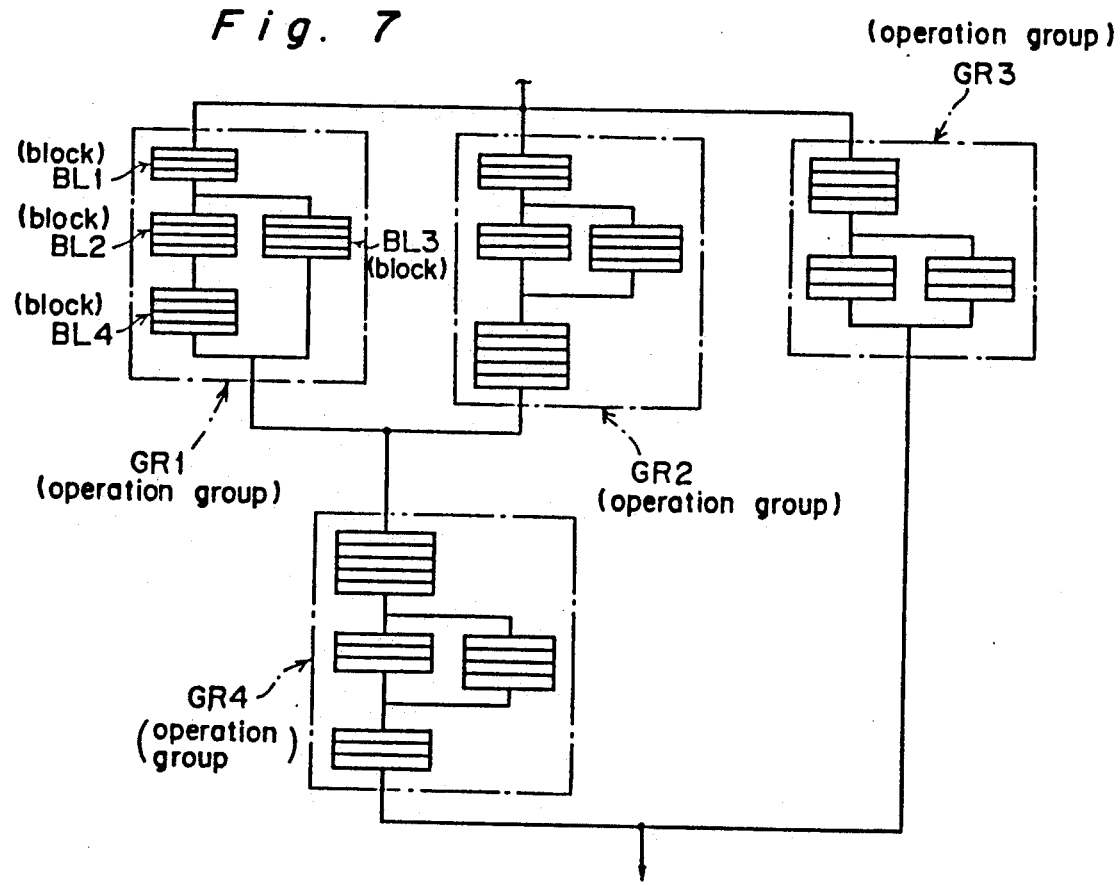
FIG. 7 is a flow-chart showing the operation system of the production line, which are divided into operation groups, operation blocks, and operation steps.

As shown in FIG. 7, the operations to be performed at the stations Stn1, Stn2, Stn3, and Stn4 constitute the operation groups GR1, GR2, GR3, and GR4, respectively. Each of the operation groups GR1, GR2, GR3, and GR4 is divided into a plurality of operation blocks so that the operations in one operation group are sequentially performed without interfering with those of any other blocks from beginning to end of the operations under the normal condition. Further, each of the operation blocks is divided into a plurality of operation steps.

The detailed explanation will now be made by taking the case of the first operation group GR1 comprising the sequential operations to be performed at the first station Stn1.

The first operation group GR1 is divided into a plurality of operation blocks BL1, BL2, BL3, and BL4. Each of the operation blocks is divided into a plurality of operation steps. There is a case in which an operation group is composed of a single operation group and an operation block is composed of a single operation step.

The plurality of operation steps contained in each operation block are sequentially executed in a predetermined order and similarly, the plurality of operation blocks contained in each operation group are sequentially executed in a predetermined order. Further, the operation groups GR1, GR2, GR3, and GR4 are sequentially controlled in a predetermined order.

The fundamental concept of a failure diagnosing method of a production line according to the present invention will be explained herein after.

Figure 8:
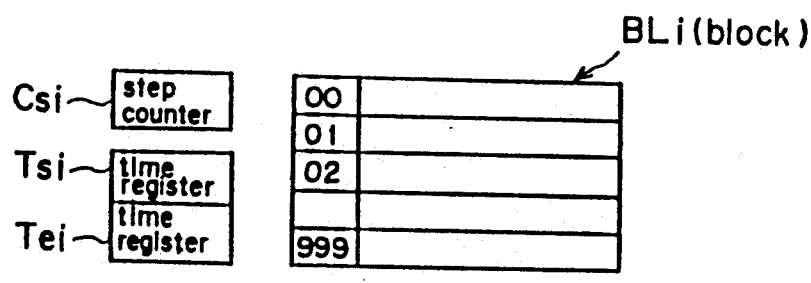
FIG. 8 is a schematic view a certain operation block provided with a step counter and timer registers.

As shown in FIG. 8, in the failure diagnosing method, each of the operation blocks BLi is provided with a step counter Csi, and time registers Tsi and Tei. Steps carried out at respective operation steps in the block BLi are sequentially inputted into the step counter Csi. A timer value at the time when the operation in the block BLi has started is inputted into the timer register Tsi on the basis of the time of a clock contained in a microcomputer of a failure diagnosing apparatus. A timer value at the time when the operation in the block BLi has terminated is inputted into the timer register Tei.

Based on the data inputted into the timer registers Tsi and Tei, an operation period of time Txi (=Tei−Tsi) from beginning to end of the sequential operations of the operation steps in the block BLi is calculated. The measured operation period of time Txi is stored in a memory of the microcomputer. A reference period of time Tsti (=Txim+3$\sigma$) with respect to the block BLi is inputted to the microcomputer. The reference period of time Tsti is determined by the mean value Txim of measured operation time periods in the predetermined number of cycles under the normal condition and a standard deviation value $\sigma$. It is favorable that data is updated for each cycle and the updated data is stored by the memory of the microcomputer. The abnormality of the operation block BLi can be detected by comparing the reference period Tsti with the measured operation period Txi. That is, if the measured operation period Txi is less than the reference period Tsti, it is diagnosed that the operation of the operation block BLi is normal. In contrast, if the former is greater than the latter, it is diagnosed that the operation of the operation block BLi is abnormal.

If it is determined that the block BLi is abnormal, an operation step which has caused the failure can be specified by reading the value of the step counter Csi of the block BLi. That is, assuming that the execution of the operation block BLi is completed, an operation step, the value of which is to be counted by the step counter Csi after the value of the step number of the current operation step the value is counted, is specified as the fault operation step. In order to specify the fault operation step, the sequence circuit is searched back to detect which of contacts in a sequence ladder diagram is out of order.

Figure 9:
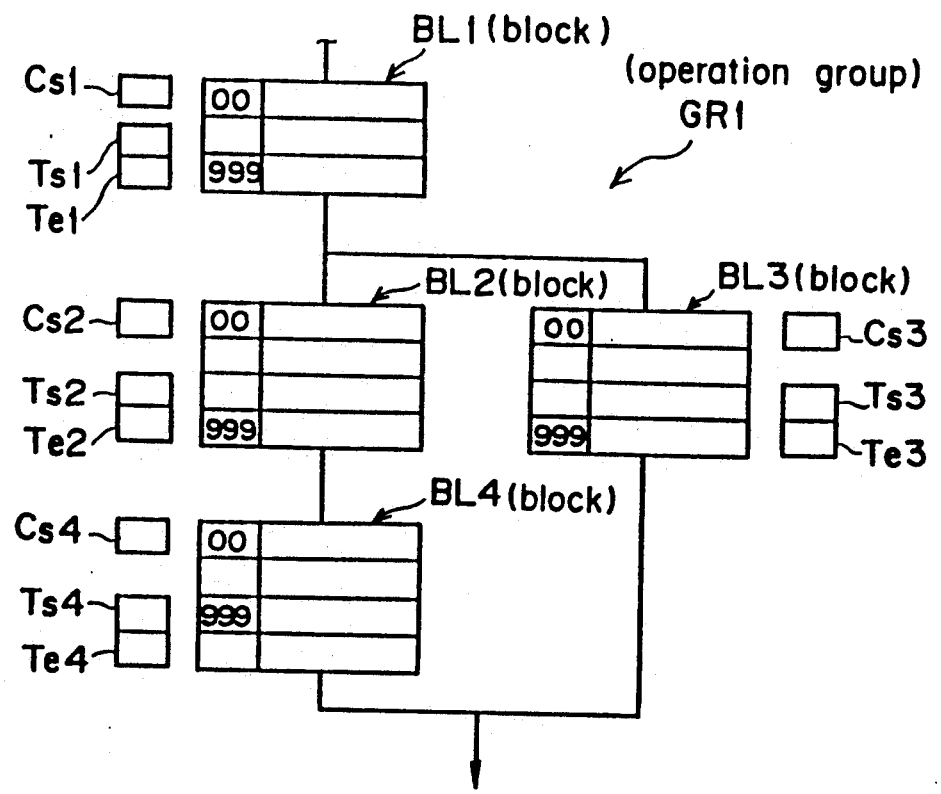
FIG. 9 is a flow-chart showing operations of the first group of the production line of FIG. 7 by dividing into operation blocks and operation steps.

Referring to FIGS. 6 and 7, the sequence control of the first group GR1 comprising sequential operations to be performed in the first station Stn1 of the production line will be discussed. As shown in FIG. 9, each of the operation blocks BL1, BL2, BL3, and BL4 is provided with step counters Cs1, Cs2, Cs3, and Cs4, respectively and measured operation period Tx1, Tx2, Tx3, and Tx4 of each of the operation blocks BL1, BL2, BL3, and BL4 calculated by data inputted to each of the time registers Ts1/Te1, Ts2/Te2, Ts3/Te3, and Ts4/Te4 are stored in the memory of the microcomputer. Each of the measured operation periods Tx1, Tx2, Tx3, and Tx4 of each of the operation blocks BL1, BL2, BL3, and BL4 is compared with the reference period Tst1, Tst2, Tst3, and Tst4 thereof. Thus, whether or not the failure has occurred in each block is monitored.

Although not shown, each of the operation groups GR1, GR2, GR3, and GR4 is provided with a time register for measuring an operation period counted from an operation start point until an operation completed point so as to diagnose the abnormality of each group by comparing measured operation period of each group with each reference period. If any of the groups is diagnosed to be abnormal, the value of the step counters provided in each block is searched to find which of the blocks has a number other than "999" which indicates an operation completion. A block having the number other than "999" is specified as the fault operation step. Further, a fault operation block is specified according to the value of the step counter.

Referring to FIGS. 1 through 5, an example of the assembling apparatus 1 of the vehicle assembling line will be described.

Figure 10B:
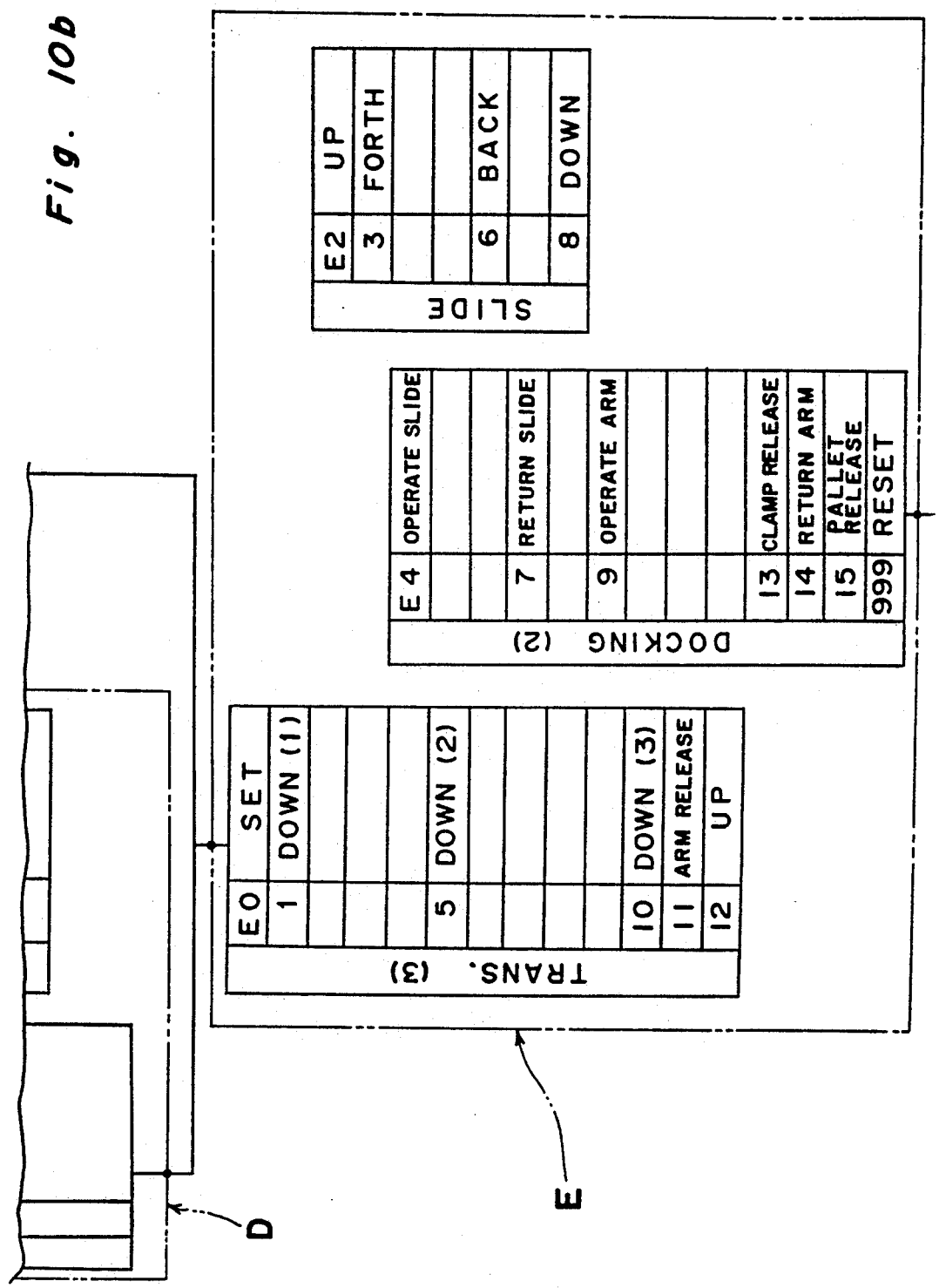
FIG. 10, consisting of FIGS. 10a, 10b, and 10c, is a flow-chart of operation blocks and operation steps for explaining the operation of the assembling apparatus of FIG. 1.

FIG. 10, consisting of FIGS. 10a, 10b, and 10c, is a flow-chart showing the order for the transfer device Q2 of the assembling apparatus 1 to carry out an operation. FIG. 5 also shows operation blocks defined as units of sequential operations which are performed independently, or without interfering with each other throughout the operation of the transfer device Q2 under the normal condition. As shown in FIG. 10, the operation to be performed in each operation block is divided into a plurality of operation steps to be executed according to a predetermined order. In each of the operation blocks, its operation can be made from the first operation step until the final operation step without interfering with operation steps of other operation blocks.

According to this embodiment, the operation step of each output element of the operation system of the assembling apparatus 1 is divided into six operation blocks from A to F, namely, the positioning device Q1, the transfer device Q2, the docking device Q3, the slide device Q4, the pallet transporting device Q5, and the screwing robots Q6. That is, the operation step of the positioning device Q1 is divided into two blocks A and D; that of the transfer device Q2 is divided into four blocks B, D, E, and F; and that of the docking device Q3 is divided into two blocks C and E. All operations of the slide device Q4 are carried out in the block E. The operations of the pallet transporting device Q5 and the screwing robots Q6 are performed in the block F. The order of performing respective operation blocks is specified by the program so that the operation in the respective operation blocks are carried out downward in time series.

In the flow-chart of FIG. 10, the operation blocks in which a plurality of blocks are shown in the same row, for example, blocks A, B, and C, the operations of these blocks, namely, the operations of the operation steps of the respective operation blocks are simultaneously executed. As shown in the blocks D, E, and F, if an operation block has operation steps of a plurality of output elements, sequential operations are performed in cooperation with the output elements and the operation steps in the respective blocks are executed in the predetermined order in combination with the operation steps of each output element.

Figure 11:
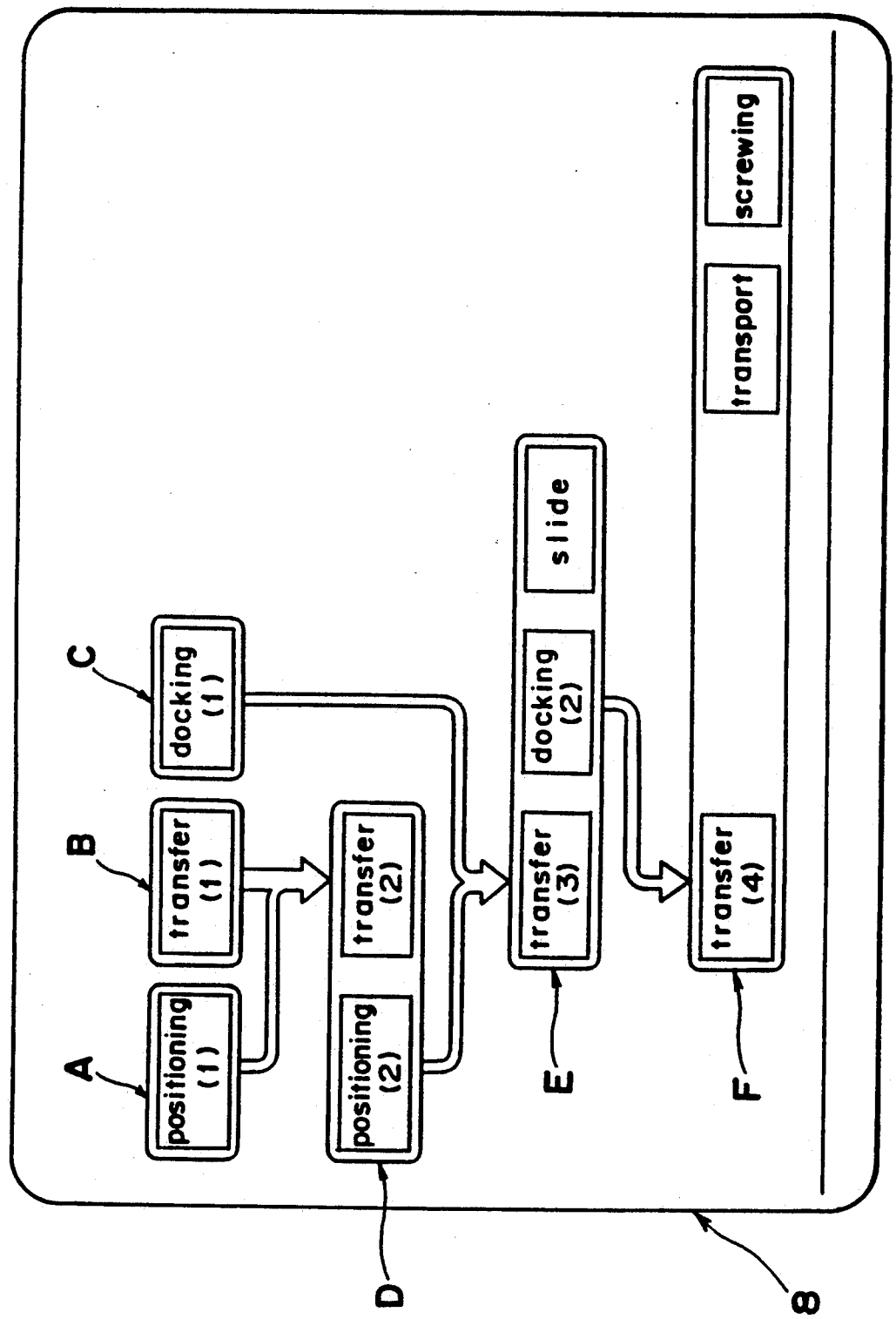
FIGS. 11 and 12 are front views of a monitor display screen of a display device provided in the assembling apparatus of FIG. 1.

The assembling apparatus 1 is provided with a failure diagnosing device for monitoring whether or not the assembling apparatus 1 is normally operating and searching a defective portion. As shown in FIG. 11, a flow-chart showing the aforementioned operation block is displayed on the screen of a display device 8 mounted on the failure diagnosing device, so that the entire operation system of the assembling apparatus 1 can be monitored.

Figure 12:
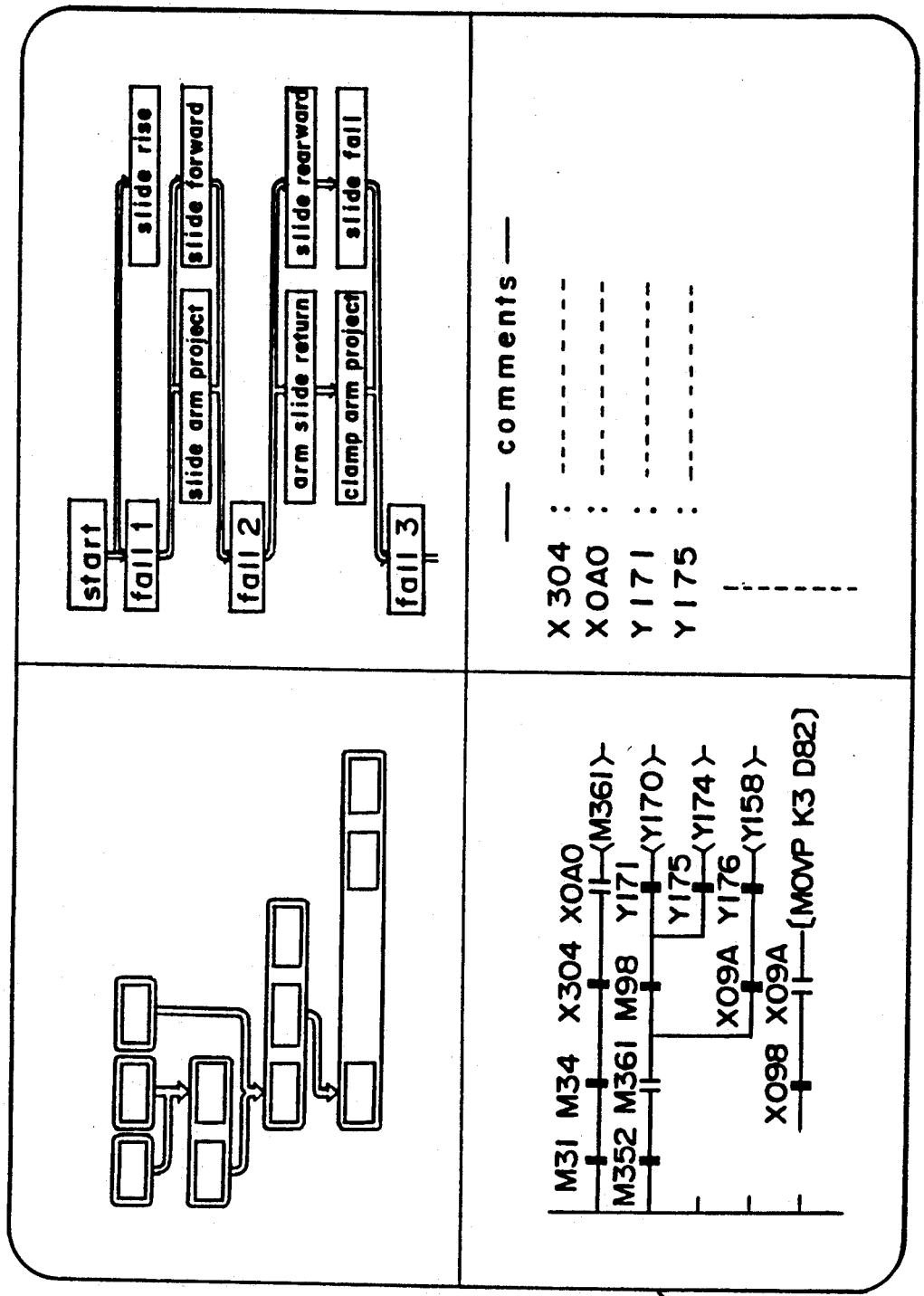

According to the embodiment, the progress of an operation block and an operation step to be executed are controlled by a step counter contained in the failure diagnosing device. The monitor display device 8 of FIG. 11 displays an operation block which is to be executed colorless, an operation block which has been executed in a color. An operation block being executed flickers on the screen. When the operation system of the assembling apparatus 1 fails, the screen of the display device 8 is switched. That is, as shown in FIG. 12, the display screen shows the flow-chart of the entire operation system, the flow-chart of sequential operation steps constituting the block corresponding to a defective portion, the ladder diagram of the defective portion, and a comment showing the names etc. of contacts on the ladder diagram.

The operation of the assembling apparatus 1 will be discussed with reference to the flowchart of FIG. 10.

In the initial condition before the operation of the assembling apparatus 1 starts,, the body W transported from the preceding equipment is placed on the movable base 12 of the positioning station S1 without being positioned thereon and the movable base 12 is positioned on the starting portion of the transfer device Q2 without the movable base 12 being positioned on the rail 11, and the pallet P is positioned in the docking station S2 without being locked by the pallet locking portion 25a.

At positioning step (1), when the assembling apparatus 1 starts its operation, the positioning device Q1, the transfer device Q2, and the docking device Q3 start their operations simultaneously. The following sequential operations are carried out at steps in the block A: The positioning device Q1 positions the movable base 12 lengthwise, the respective receiving members 13 vertically, and the body W on the movable base 12 before holding the body W on the carrier 17 of the transfer device Q2. At docking step 1, the following sequential operation are performed at steps of the block C before a docking operation is carried out: The docking device Q3 locks the pallet P in the predetermined position and the clamp arms 26 hold the damper units 3a in the predetermined posture so that the body W and the suspensions 3 do not interfere with each other when both dock with each other. The transfer device Q2 performs the following sequential transfer operation (1) at operation steps in the block B. That is, at operation step B0, the carrier 17 is located at the initial position. At operation step B1, the carrier 17 moves downward toward the positioning station S1. At this time, the respective body holding arms 19 mounted on the lower end of the carrier 17 are locked at the backward positions so that the body holding arms 19 and the body W do not interfere with each other. When the execution of the operation step B1 is terminated, the operation in the block B terminates. Then, at operation step B999, the instruction to the transfer device Q2 is reset.

Upon termination of the operation steps of the blocks A and B, the operation of the block D starts. In the block D, the positioning device Q1 performs positioning operation (2) and the transfer device Q2 perform transfer operation (2). That is, at operation step D1, the body holding arms 19 of the transfer device Q2 are released from the body W and the pins 19a of the holding arms 19 are moved forward to the position at which the pins 19a engage the body W, then, the body holding arms 19 are locked in this condition. Then, at step D2, the carrier 17 holding the body W is moved upward. At step D3, a reference pin (not shown) of the positioning device Q1 is moved backward. At step D4, the carrier 17 is moved forward to be positioned above the docking station S2. Thereafter, at step D5, the body receiving members 13 of the positioning device Q1 are moved downward. Thus, at step D999, all the operations of the block D are completed. The positioning device Q1 returns to the initial condition at step D5 after the assembling apparatus 1 completes all the operations.

Upon termination of the operation block D, the following operations of the block E starts: The transfer device Q2 performs transfer operation (3), the docking device Q3 carries out docking operation (2), and the slide device Q4 performs slide operation. That is, at steps E1, E5, and E10, the body W held by the carrier 17 of the transfer device Q2 is moved downward in three stages toward the docking station S2. Then, the engine 2 and the suspensions 3 positioned on the pallet P are joined with the body W. While the body W is being moved downward, at steps E4, E7, and E9, the clamp arms 26 and the arm slides 29 of the docking device Q3 move the damper units 3a lengthwise and widthwise, and at steps E2, E3, E6, and E8, the slide device Q4 moves the engine 2 lengthwise. That is, the operations performed at steps E4, E7, E9, E2, E3, E6, and E8 are to prevent the engine 2 and the damper units 3a from interfering with the body W. After the engine 2 and the suspensions 3 are docked with the body W, at step E11, the body holding arm 19 of the carrier 17 is moved backward so that the body W is released from the carrier 17. Thus, the docking operation is completed. Thereafter, at step E12, the carrier 17 from which the body W has been released is moved upward. Then, at step E13, the damper units 3a are released from the clamp arms 26, and at step E14, the clamp arms 26 are moved backward, and at step E15, the pallet P is released from the docking device Q3. Thus, at step E999, all the operations of the block E are completed.

After the termination of the operation block E, the operation of the block F starts, i.e., transfer operation (4) is performed by the transfer device Q2; the pallet P is transported by the transporting device Q5; and the robots Q6 perform the screwing operation. That is, at step F1, the carrier 17 of the transfer device Q2 is moved backward to the start position of the transfer device Q2. At step B0, the carrier 17 is returned to the initial position (operation step B0). Then, at step F2, the pallet P carrying the body W with which the engine 2 and the suspensions 3 have docked is moved forward to the clamping station S3 by the pallet transporting device Q5. After the robots Q6 perform the screwing operation, at step F999, instructions to the transfer device Q2, the pallet transporting device Q5, and the robots Q6 are reset. After the termination of the operation block F, the body W to which the engine 2 and the suspensions 3 have been clamped is transported from the clamping station S3 toward the subsequent equipment by the pallet transporting device Q5 and the pallet P to be used for the following assembling operation is set in the docking station S2. Thus, the assembling apparatus 1 returns to the initial condition.

According to the embodiment, home positions are set, for example, in the case of the transfer device Q2, not only in the initial condition (operation step B0) of the assembling apparatus 1, but also in in the operation steps of D0, E0, and F0 corresponding to the initial conditions of the respective blocks of the blocks D, E, and F so that the operation can be restarted from each of the home position of the operation steps of D0, E0, and F0 without interfering with devices of other operation steps.

Accordingly, for example, in order to actuate the assembling apparatus 1 automatically after a defective portion is repaired supposing that a failure has occurred in the assembling apparatus 1 at operation step E10 of the block E and consequently, the operation of the assembling apparatus 1 stops, it is not necessary to return the carrier 17 of the transfer device Q2 to the initial condition of the assembling apparatus 1, but the operation of the assembling apparatus 1 can be restarted from step E0. That is, unlike the known art in which the operation of an assembling apparatus starts from the initial condition corresponding to operation step B0 because a home position is set only in the initial condition of the assembling apparatus, the period of time for restoring the assembling apparatus 1 to the normal condition can be greatly reduced.

Home positions can be set in operation steps of each operation block corresponding to the initial condition not only in the transfer device Q2, but also in the other output elements such as the positioning device Q1 and the docking device Q3, the operation steps of which are contained in a plurality of operation blocks.

According to the embodiment, if a failure occurs in the assembling apparatus 1, the monitor screen of the display device 8 displays a home position of an operation step precedent and closest to a fault operation step and also displays an output element which has not returned to the corresponding home position. Thus, the monitor screen allows an operator to confirm an output element which has not returned to the home position and the home position closest to the output element. Accordingly, an operation to return the output element to the home position can be effectively accomplished.

In addition to the assembling apparatus for installing parts and an engine on a vehicle, the present invention can also be applied to any other sequentially controlled apparatus or equipment.

According to a known sequentially controlled apparatus, in order to search a defective portion as a result of the occurrence of a failure at an operation step, it is necessary for an operator skilled in handling the apparatus and system to search the defective portion based on a ladder diagram. It is difficult to immediately specify the defective portion by checking the ladder diagram. For example, if the instruction system of an OR construction fails, it is necessary to check each path constituting the OR construction in order to find which of the paths has failed. It is very complicated to specify the defective portion of an apparatus operated according to a complicated program formed by employing a great number of OR and AND constructions. In practice, it is almost impossible for the operator to specify the defective portion because much time and labor are required for the operator to do so.

According to the embodiment, a defective contact or device can be automatically retrieved by an address map displaying the position of the defective contact or device on a ladder diagram corresponding to an operation step which has caused a failure.

The method for retrieving a defective portion will be described hereinafter.

Figure 13:
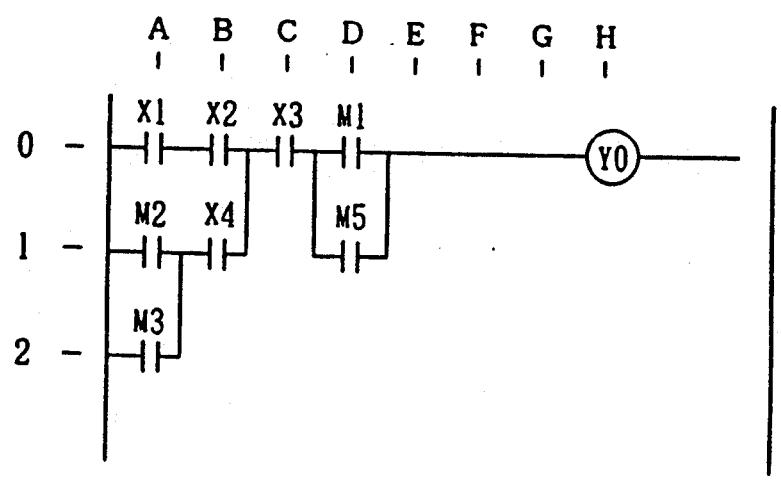
FIG. 13 is a circuit diagram showing an example of a sequence circuit of a certain operation step.

FIG. 13 is an example of a ladder diagram corresponding to an operation step. Reference numerals X1, X2, X3, and X4 show contacts connected with detecting elements such as limit switches attached to the output elements of an apparatus. Reference numerals M1, M2, M3, and M5 show internal coils which are turned on when the condition for progressing operation steps according to a predetermined order is satisfied. Reference numeral Y0 indicates an external coil which is outputted to an external output element.

According to the embodiment, each horizontal line is shown by address symbols of 0, 1, 2, and portions between adjacent nodes are shown by address symbols A through H. The position of each contact and coil on the ladder diagram is shown by an address symbol and registered by the address. Start address and destination addresses are registered to display the start and termination points of the contact and the coil. The addresses of the contact and the coil can be displayed by the address symbols A through H written on nodes on the lines 0, 1, and 2.

Figure 14:
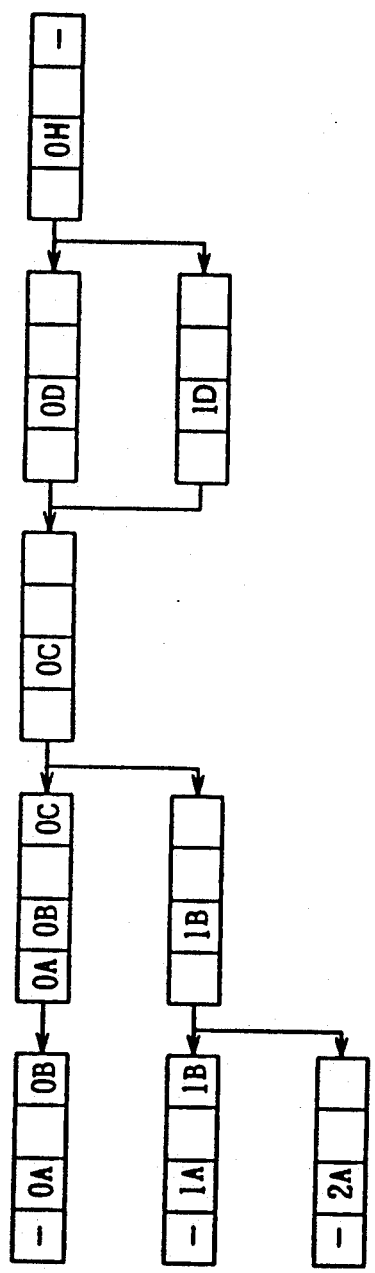
FIG. 14 is an address map for the sequence circuit of FIG. 13.
Figure 15:
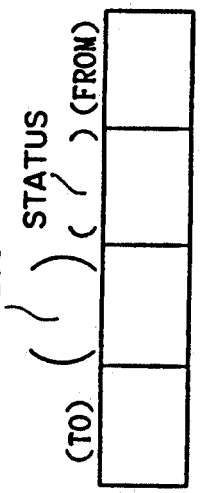
FIG. 15 is an explanatory view for explaining a address display method of the address map of FIG. 14.

The position of the contact and the coil on the ladder diagram are allocated on the memory of a microcomputer contained in a failure diagnosing apparatus on the basis of the registered addresses. Thus, an address map as shown in FIG. 14 is formed. As shown in FIG. 15, in addition to the self-address, a destination address (TO), and a start address (FROM), status column which displays a self operation condition by 0 (ON) or 1 (OFF) is provided in the address map.

If a failure occurs in an operation step provided with the address map thus formed and an external coil Y0 is not ON, which of the contacts or the coils has failed can be automatically specified by searching the address map sequentially.

Figure 16:
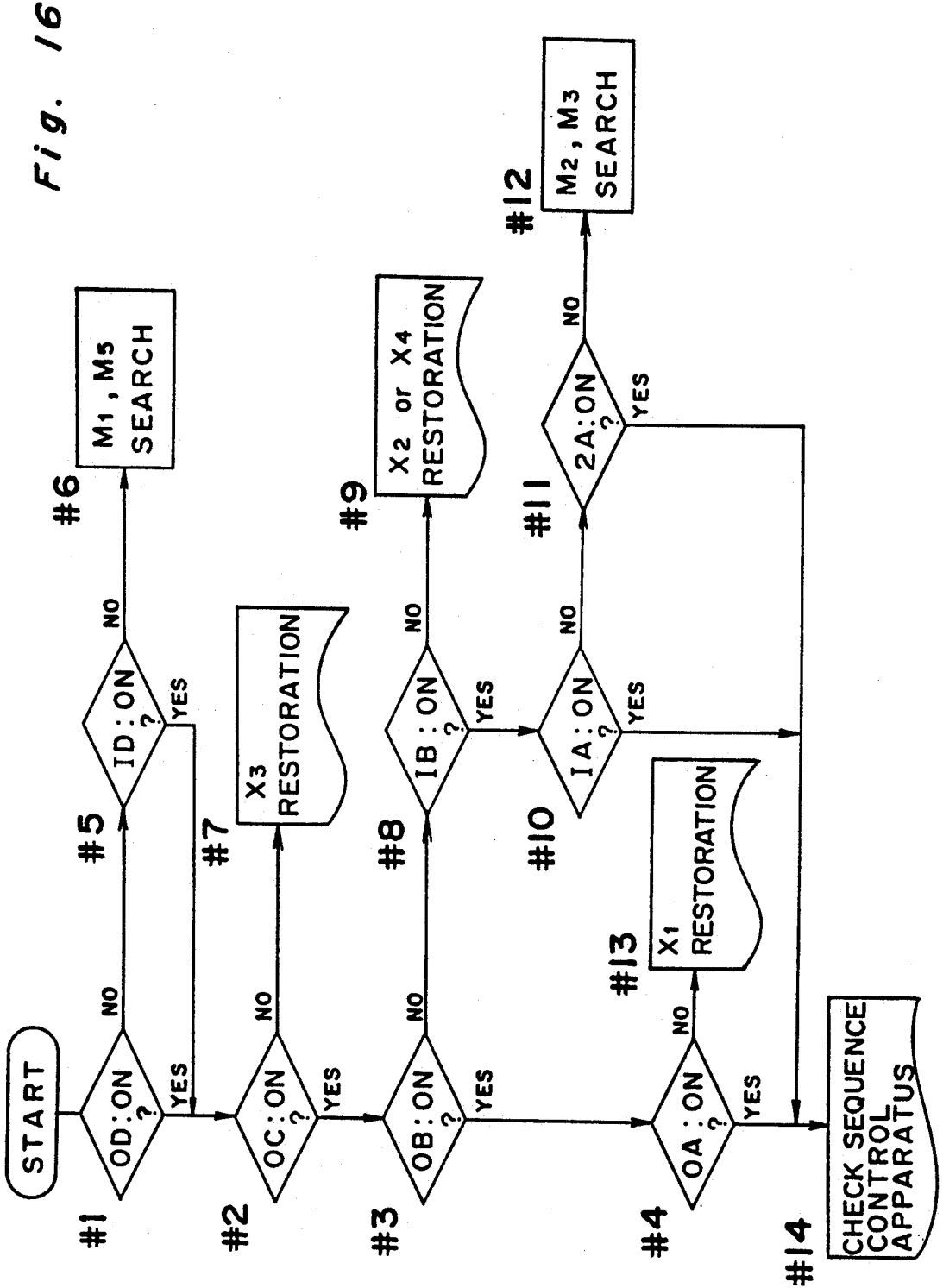
FIG. 16 is a flow-chart for explaining a method for retrieving a fault portion in the sequence circuit of FIG. 13.

The method for making an automatic retrieval is described with reference to a flow-chart of FIG. 16.

Upon start of the automatic retrieving system, at step #1, a determination is made as to whether or not an address 0D (internal coil M1) is ON. If yes, address 0C (contact X3), address 0B (contact X2), and address 0A (contact X1) composing AND condition for turning on the coil Y0 are sequentially retrieved. If these addresses are all ON, at step #14, an instruction for checking a sequentially controlled apparatus (hereinafter referred to as apparatus) is given assuming that constituting elements of the apparatus is out of order.

If no at step #1, a determination is made at step #5 as to whether or not an address 1D (internal coil M5) constituting the address 0D and OR condition is ON. If no, at step #6, a comment indicating whether or not the internal coils M1 and M5 satisfy the interlock condition is displayed. If yes at step #5, the program goes to step #2.

If no at step #2, the contact X3 can be specified as the defective portion. At step #7, a comment indicating the restoration of the limit switch connected with the contact X3 is displayed.

If no at step #3, a determination is made at step #8 as to whether or not the address 1B (contact X4) is ON. If no, a comment indicating the restoration of the contact X4 or X2 is displayed. If yes at step #8, a determination is made at step #10 as to whether or not the address 1A (internal coil M2) is ON. If yes, it is checked at step #14 whether or not the apparatus has failed.

If no at step #10, a determination is made at step #11 as to whether or not the address 2A (internal coil M3) is ON. If yes, a determination is made at step #14 as to whether or not the apparatus has failed. If no at step #11, a comment indicating that the internal coils M2 and M3 are searched is displayed at step #12. The searches of the internal coils M2 and M3 at step #12 and the searches of the internal coils M1 and M5 at step #6 are automatically performed in the same manner.

If no at step #4, a comment indicating the recovery of the contact X1 is displayed at step #13.

Figure 17:
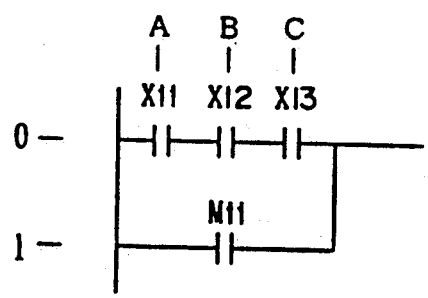
FIG. 17 is a sequence circuit diagram according to another address display method.

In the above retrieval method, the destination address TO and the start address FROM as well as the self-address are displayed and registered to check the positions of each contact and coil on the ladder diagram, but the equal sign (=) may be used to define the start and termination points thereof. According to this display method, an address display can be simplified using the ladder diagram as shown in FIG. 17. For example, the internal coil M11 is displayed as M11=1A, 1B, 1C and the contacts X11, X12, and X13 are displayed as X11=0A, X12=0B, and X13=0C.

In the above-described embodiment, the respective operation steps to be executed by the principal output elements (the positioning device Q1, the transfer device Q2, the docking device Q3, the slide device Q4, the pallet transporting device Q5, and the screwing robots Q6) of the operation system of the assembling apparatus 1 are distributed to operation blocks so that the operation steps of different output elements are combined with each other considering that sequential works are accomplished in cooperation with the plurality of output elements. This can be understood with reference to the operation blocks D, E, and F of FIG. 10. But each block may be composed of a group comprising operation steps of one output element.

As well known, much labor is required to form a computer program, for example, a sequence control program for use in a sequence control system. Therefore, an automatic formation of the computer program is considered. But in order for computers of the known apparatus to form a sequence control program, much labor is required to input data. Thus, it is difficult to reduce the number of program forming processes.

Another embodiment of the present invention will be described with reference to a production line which is operated according to a method of dividing operation blocks in a manner different from that of the previous embodiment and an apparatus for automatically forming a sequence control program capable of effectively reducing the number of program forming process.

Figure 19:
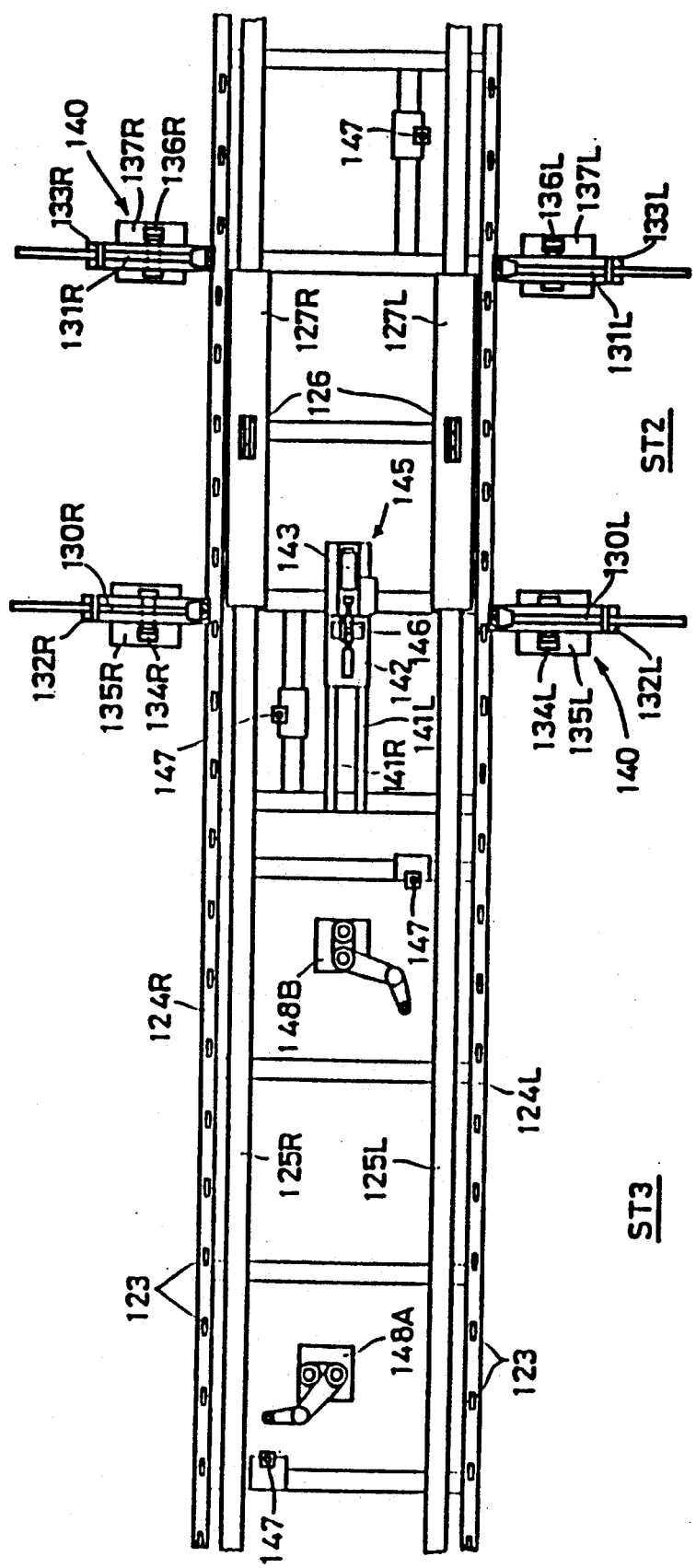

A vehicle assembling line shown in FIGS. 18 and 19 comprises a positioning station ST1 for receiving a body 111 of a vehicle (hereinafter referred to as body 111) by a receiving base 112 and appropriately positioning the body 111 on the receiving base 112 by controlling the position of the receiving base 112; a docking station ST2 for combining an engine 114 placed on a pallet 113 at a predetermined position thereof, a front suspension (not shown), and a rear suspension 115 with the body 111; and a clamping station ST3 for clamping the engine 114, the front suspension, and the rear suspension 115 combined with the body 111 to the body 111 with screws. The vehicle assembling line further comprises an overhead transfer device 116 which holds the body 111 while it is moving from the positioning station ST1 to the docking station ST2. The vehicle assembling line further comprises a pallet transporting device 117 for transporting the pallet 113 from the docking station ST2 to the clamping station ST3.

The receiving base 112 reciprocates along a rail 118 in the positioning station ST1. Although not shown, the positioning station ST1 includes the following means for controlling the receiving base 112. A positioning means BF for moving the receiving base 112 for appropriately positioning the front section of the body 111 in the width direction thereof by moving the body 111 in the direction perpendicular to a rail 118, namely, in the body width direction as well as in the direction along the rail 118, namely, in the vehicle lengthwise direction, a positioning means BR for appropriately positioning the rear section of the body 111 in the body width direction, and a positioning means TL for positioning the body 111 in the vehicle lengthwise direction of the body 111, and vertically movable reference pins FL, FR, RL, and RR which the left and right sections of the body 111 of the front and rear sections thereof so as to appropriately position the body 111 on the receiving base 112. The positioning device 119 of the positioning station ST1 comprises the positioning means BF, BR, and TL and the vertically movable reference pins FL, FR, RL, and RR.

The transfer device 116 comprises a guide rail 120 positioned above both the positioning station ST1 and the docking station ST2 and a carrier 121 which moves along the guide rail 120. A vertically movable hanger frame 122 mounted on the carrier 121 supports the body 111. The pallet transporting device 117 comprises a pair of guide members 124L and 124R having a plurality of supporting rollers 123 for supporting the lower surface of the pallet 113, a pair of transporting rails 125L and 125R positioned in parallel with the guide members 124L and 124R, respectively, a pair of pallet transporting receiving bases 127L and 127R having a pallet locking member 126 for locking the pallet 113 and moving along the transporting rails 125L and 125R, a linear motor mechanism (not shown) for moving the pallet transporting receiving bases 127L and 127R.

The docking station ST2 includes a pair of front clamp arms 130L and 130R and a pair of rear clamp arms 131L and 131R for supporting a strut of the front suspension and a strut 115A of the rear suspension 115, respectively so as to allow both struts to be combined with the body 111. The front clamp arms 130L and 130R are mounted on mounting plates 132L and 132R, respectively so that they can move in the direction perpendicular to the transporting rails 125L and 125R, and the rear clamp arms 131L and 131R are mounted on mounting plates 133L and 133R so that they can move in the direction perpendicular to the transporting rails 125L and 125R. The end portions of the front clamp arms 130L and 130R disposed on the side of the guide members 124R and 124L engage the strut of the front suspension. Similarly, the end portions of the rear clamp arms 131L and 131R disposed on the side of the guide members 124R and 124L engage the strut 115A of the rear suspension 115. An arm slide 134L allows the mounting plate 132L to move along the transporting rails 125L and 125R with respect to a fixed base 135L. Similarly, an arm slide 134R allows the mounting plate 132R to move along the transporting rails 125L and 125R with respect to a fixed base 135R. An arm slide 136L allows the mounting plate 133L to move along the transporting rails 125L and 125R with respect to a fixed base 137L. Similarly, an arm slide 136R allows the mounting plate 133R to move along the transporting rails 125L and 125R with respect to a fixed base 137R. Accordingly, when the front ends of the front clamp arms 130L and 130R are in engagement with the strut of the front suspension, the front clamp arms 130L and 130R are movable widthwise and lengthwise. Similarly, when the front ends of the rear clamp arms 131L and 131R are in engagement with the strut 115A of the rear suspension 115, the rear clamp arms 131L and 131R are movable widthwise and lengthwise. Thus, the docking device 140 comprises the front clamp arms 130L and 130R, the arm slides 134L and 134R, the rear clamp arms 131L and 131R, and the arm slides 136L and 136R.

The docking station ST2 further comprises a slide device 145 comprising a pair of slide rails 141L and 141R positioned in parallel with the transporting rails 125L and 125R, a movable member 142 which slides along the slide rails 141L and 141R, and a motor 143 for driving the movable member 142. The movable member 142 of the slide device 145 is provided with an engaging means 146 which engages a movable engine supporting member (not shown) mounted on the pallet 113. The docking station ST2 further comprises two vertically movable pallet positioning pins 147 for positioning the pallet 113 at a predetermined position thereof. When the engine 114, the front suspension, and the rear suspension 115 placed on the pallet 113 are joined with the body 111 supported by the vertically movable hanger frame 122 of the transfer device 116, the engaging means 146 of the slide device 145 is moved lengthwise, namely, along the rails 125R and 125L in engagement with the movable engine supporting member mounted on the pallet 113 positioned by the vertically movable pallet positioning pin 147 so that the engine 114 is moved lengthwise with respect to the body 111. Thus, the interference between the body 111 and the engine 114 can be avoided.

The clamping station ST3 includes a screwing robot 148A for clamping to the body 111 the engine 114 and the front suspension combined with the body 111, a screwing robot 148B for clamping to the body 111 the rear suspension 115 combined with the body 111. Similarly to the docking station ST2, two vertically movable pallet positioning pins 147 for positioning the pallet 113 at a predetermined position thereof.

A sequence control section is connected to the positioning device 119 and the transfer device 116 of the positioning station ST1, the docking device 140, the slide device 145, and the pallet transporting device 117 of the docking station ST2, and the robots 148A and 148B of the clamping station ST3. The sequence control section controls the operations of these devices based on a sequence control program. The devices 119, 116, 140, 145, 117, 148A, and 148B are hereinafter referred to as equipment.

The operation to be performed by the equipment is accomplished by the following twelve operation blocks, or units Each of the operation blocks completes its operation independently.

B0: an operation block in which the positioning device 119 positions the body 111 on the receiving base 112 at a predetermined position thereof (operation block for positioning body on receiving base).

B1: an operation block for making a preparation so that the transfer device 116 transfers the body 111 (operation block to prepare for transfer device).

B2: an operation block for making a preparation so that the front clamping arms 130L and 130R of the docking device clamp the strut of the front suspension and the rear clamping arms 131L and 131R thereof clamp the strut 115A of the rear suspension 115 (operation block to prepare for strut clamping).

B3: an operation block in which the body 111 placed on the receiving base 112 positioned by the positioning device 119 is transferred to the vertically movable hanger frame 122 of the transfer device 116 so that the body 111 is transported forward (operation block for transferring body to transfer device).

B4: an operation block for making a preparation so that the engaging means 146 mounted on the movable member 142 of the slide device 145 engages the movable engine supporting member placed on the pallet 113 (operation block to make preparation for slide device).

B5: an operation block in which the positioning device 119 returns the receiving base 112 to the initial position (operation block for returning receiving base to initial position).

B6: an operation block for joining the body 111 supported by the vertically movable hanger frame 122 of the transfer device 116 with the engine placed on the pallet 113, the strut of the front suspension placed on the pallet 113 and clamped by the front clamp arms 130L and 130R, and the strut 115A of the rear suspension 115 placed on the pallet 113 and clamped by the rear clamp arms 131L and 131R (operation block for docking engine and suspension with body).

B7: an operation block in which the transfer device 116 returns to the initial position (operation block for returning transfer device to the initial position).

B8: an operation block for returning the front clamp arm 130L and 130R of the docking device 140 and the rear clamp arms 131L and 131R thereof to the initial positions (operation block for returning clamp arms to initial positions).

B9: an operation block for moving the linear motor so that the pallet transporting device 117 transports the pallet 113, on which the body 111 joined with the engine 114, the front suspension and the rear suspension 115 are placed, to the clamping station ST3 (operation block for moving linear motor).

B10: an operation block in which the robot 148A clamps, by means of screws, the engine 114 and the front suspension joined with the body 111 (first screwing operation block)

B11: an operation block in which the robot 148B clamps, by means of screws, the engine 114 and the rear suspension 115 joined with the body 111 (second screwing operation block).

Each of the operation blocks B0 through B11 is divided into a plurality of operation steps accompanied by an output operation, respectively. For example, the operation block B0 for positioning the body on the receiving base is divided into the following 10 operation steps B0S0 through B0S9.

B0S0: an operation step for checking various conditions (operation step for checking condition).

B0S1: an operation step at which the positioning means BF moves the receiving base 112 so as to appropriately position the front section of the body 111 in the vehicle width direction (operation step for positioning BF).

B0S2: an operation step at which the positioning means BR moves the receiving base 112 so as to appropriately position the rear section of the body 111 in the vehicle width direction (operation step for positioning BR).

B0S3: an operation step at which the positioning means TL moves the receiving base 112 so as to appropriately position the body 111 lengthwise, namely, in the direction in which the rail 118 extends (operation step for positioning TL).

B0S4: an operation step at which the vertically movable pin FL engages the body 111 in the front left side section thereof (operation step for engaging FL).

B0S5: an operation step at which the vertically movable pin FR engages the body 111 in the front right side section thereof (operation step for engaging FR).

B0S6: an operation step at which the vertically movable pin RL engages the body 111 in the rear left side section thereof (operation step for engaging RL).

B0S7: an operation step at which the vertically movable pin RR engages the body 111 in the rear right side section thereof (operation step for engaging RR).

B0S8: an operation step at which the positioning means BF is returned to the initial position after completing the positioning of the front section of the body 111 widthwise (operation step for returning BF to initial position).

B0S9: an operation step at which the positioning means BR is returned to the initial position after completing the positioning of the rear section of the body 111 (operation step for returning BR to initial position).

An apparatus for automatically forming the aforementioned sequence control program will be described hereinafter. The apparatus sequentially controls the operation of equipment of a vehicle assembling line.

Figure 20:
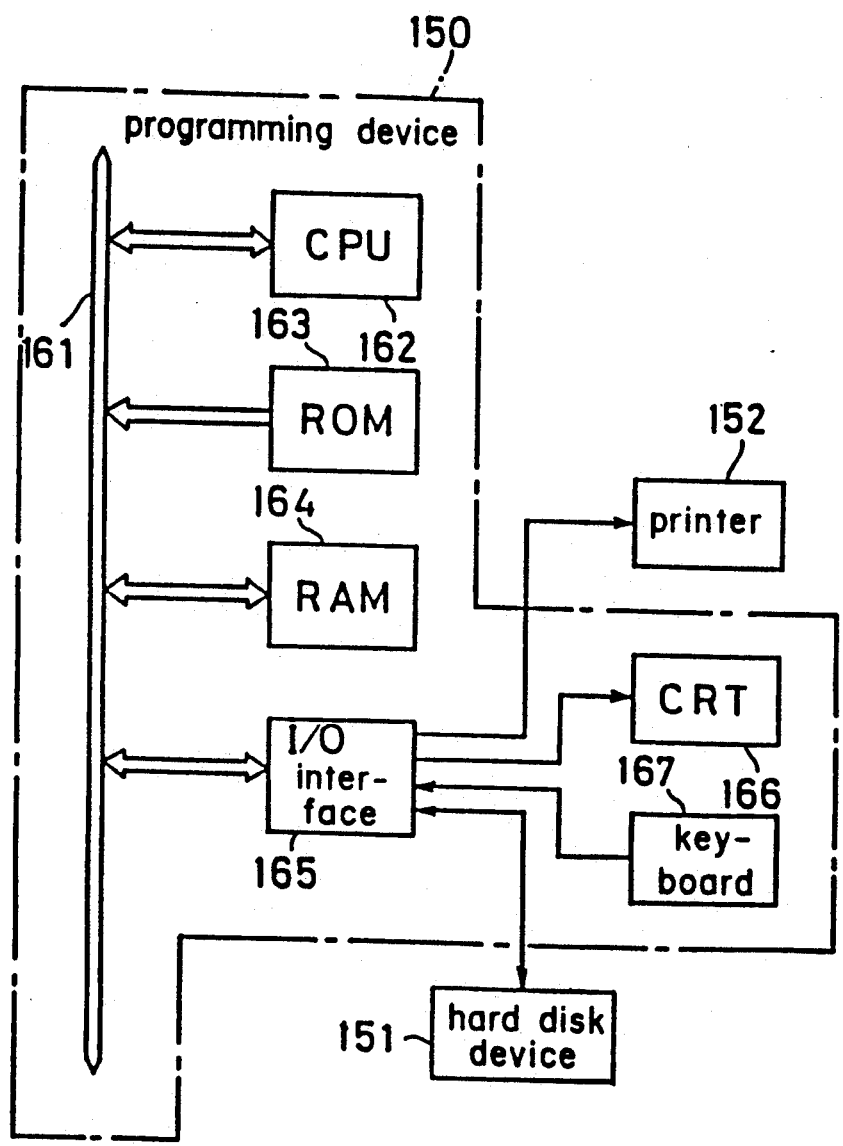
FIG. 20 is a block diagram showing an example of a programming device for automatically forming a sequence control program which is employed in the system according to the present invention.

FIG. 20 shows an example of the apparatus for forming the sequence control program. The apparatus comprises a programming device 150, a hard disk device 151 connected thereto serving as an external memory, and a printer 152. The programming device 150 contains a central processing unit (CPU) 162, a read only memory (ROM) 163, a random access memory (RAM) 164, and an input/output interface (I/O interface) 165 each connected to a bus line 161. The programming device 150 is connected to a display cathode ray tube (CRT) 166 and a keyboard 167 for inputting data and control codes through the I/O interface 165. The hard disk device 151 and the printer 152, which are external equipment, are connected to the programming device 150 through the interface 165.

Each of the operation blocks B0 through B11 previously described is indicated in the form of an operation block map of Table 1 in which the attributes of the respective operation blocks are shown. Each operation block has one 16-bit register abbreviated as "SC-REG" as shown in the operation block map of Table 1. Each time an operation step is carried out, the step number is written to the corresponding register. "FROM" denotes an operation block or operation blocks operated immediately before the operation of the current operation block starts. "TO" represents an operation block or operation blocks to be executed immediately after the execution of the current operation block is completed. "CLEAR CONDITION" shows an operation block or operation blocks at which the equipment in association with the current operation block returns to the initial condition. "EQUIPMENT" represents an equipment or equipments to be sequentially controlled in each operation block. The contents of "No" and "SC-REG" are automatically formed. The contents of "BLOCK", "FROM", "TO", "CLEAR CONDITION", and "EQUIPMENT" are inputted by the operation of the key board 167.

TABLE 1

| No. | SC-REG | BLOCK | FROM | TO | CLEAR CONDITION | EQUIPMENT |
|---|---|---|---|---|---|---|
| B0 | D1000 | receiving base positioning | body on receiving base | B3 | B5 | 119 |
| B1 | D1001 | preparation for transferring device | body on receiving base | B3 | B7 | 116 |
| B2 | D1002 | preparation for clamping strut | body on ST2 | B4 | B8 | 140 |
| B3 | D1003 | tranfer of body to transferring device | B0, B1 | B5 B6 | B7 | 119 116 |
| B4 | D1004 | preparation for slide device | B2 | B6 | B7 B8 | 145 |
| B5 | D1005 | return of | B3 | — | B5 | 119 |

TABLE 1-continued

| No. | SC-REG | BLOCK | FROM | TO | CLEAR CONDITION | EQUIPMENT |
|---|---|---|---|---|---|---|
| | | reveiving base to initial position | | | | |
| B6 | D1006 | docking of engine and suspension | B3, B4 | B7 B8 | B7 B8 | 116 140 145 |
| B7 | D1007 | return of transferring device to in-initial position | B6 | — | B7 | 116 |
| B8 | D1008 | return of clamp arm to initial position | B6 | — | B8 | 140 |
| B9 | D1009 | linear motor moving | body on ST2 | — | B9 | 117 |
| B10 | D1010 | first screwing | body on ST3 | — | B10 | 148A |
| B11 | D1011 | second screwing | body on ST3 | — | B11 | 148B |

An operation step map showing the attribute thereof is formed for each of a plurality of operation steps formed by dividing each of the operation blocks B0 through B11. For example, an input/output map of the positioning device 19 as shown in Table 2 is formed for the operation steps B0S0 through B0S9 of the block B0. "COMMENT" of the input/output map of Table 2 indicates the contents of each operation step.

TABLE 2

| 119 POSITIONING DEVICE | | | | B0, BC, and B5 | | |
|---|---|---|---|---|---|---|
| No. | COMMENT | OPERATION | OCD | C | M | I |
| A01 | work present | — | — | X0 | XA | |
| A02 | BF (positioning) | forward | Y1 | X1 | XB | |
| A03 | BF (positioning) | backward | Y2 | X2 | XC | O |
| A04 | BR (positioning) | forward | Y3 | X3 | XD | |
| A05 | BR (positioning) | backward | Y4 | X4 | XE | O |
| A06 | TL (positioning) | forward | Y5 | X5 | XF | |
| A07 | TL (positioning) | backward | Y6 | X6 | X10 | O |
| A08 | FR reference pin | forward | Y7 | X7 | X11 | |
| A09 | BR reference pin | backward | Y8 | X8 | X12 | O |
| A10 | FL reference pin | forward | Y9 | X9 | X13 | |
| A11 | FL reference pin | backward | YA | XA | X14 | O |
| A12 | RR reference pin | forward | YB | XB | X15 | |
| A13 | RR reference pin | backward | YC | XC | X16 | O |
| A14 | RL reference pin | forward | YD | XD | X17 | |
| A15 | RL reference pin | backward | YE | XE | X18 | O |

Note:
in the above, OCD: output coil device, C: checking input contact device, M: manual input contact device, I: initial position An operation step map as shown in Table 3 is formed for each of A01 through A15 by calling "COMMENT" of Table 2. Each of the operation blocks B1 through B11 has an operation step map similar to that of Table 3. The contents of "No" and "SC-REG" are automatically formed. The contents of "COMMENT", "OPERATION", and "INITIAL POSITION" are inputted by the operation of the key board 167. The contents of "OUTPUT COIL DEVICE", "CHECKING INPUT CONTACT DEVICE", and "MANUAL INPUT CONTACT DEVICE" are automatically set.

An operation step map as shown in Table 3 is formed for A01 through A15 by calling "COMMENT" of Table 2. Each of the operation blocks B1 through B11 has an operation step map similar to that of Table 3.

TABLE 3

| No. | COMMENT | OP | OC | IC | MI | IP | BC | SO |
|---|---|---|---|---|---|---|---|---|
| B000 | operation block preparation | | | | | | | |
| B0S0 | condition checking | | | Y0 | X0 | XA | | |
| B0S1 | BF (positioning) | forward | Y1 | X1 | XB | | X8 | |
| B0S2 | BR (positioning) | forward | Y2 | X2 | XC | | X9 | |
| B0S3 | TL (positioning) | forward | Y3 | X3 | XD | | | |
| B0S4 | FR reference pin | forward | Y4 | X4 | XE | | | 1 |
| B0S5 | FL reference pin | forward | Y5 | X5 | XF | | | 1 |
| B0S6 | RR reference pin | forward | Y6 | X6 | X10 | | | 1 |
| B0S7 | RL reference | forward | Y7 | X7 | X11 | | | 1 |
| B0S8 | BF positioning | backward | Y8 | X8 | X12 | O | | |
| B0S9 | BR positioning | backward | Y9 | X9 | X13 | O | | |
| B999 | operation block completed | | | | | | | |

Figure 21A:
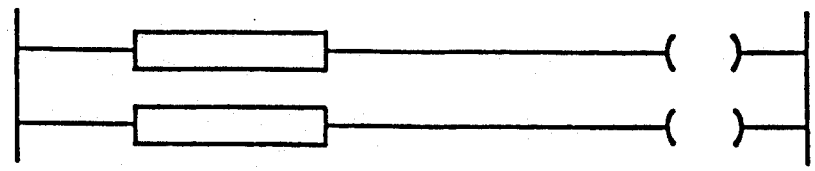
FIGS. 21A–21C are step ladder patterns for explaining the sequence control program formed by the programming device of FIG. 20.
Figure 21B:
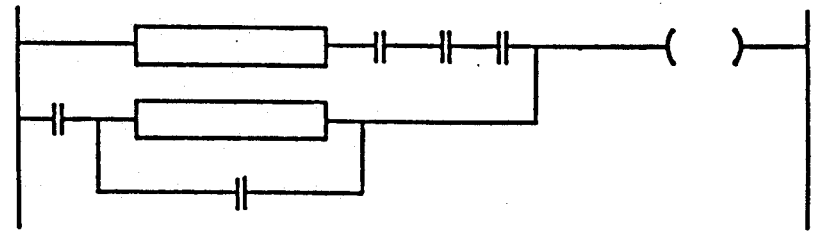
Figure 21C:
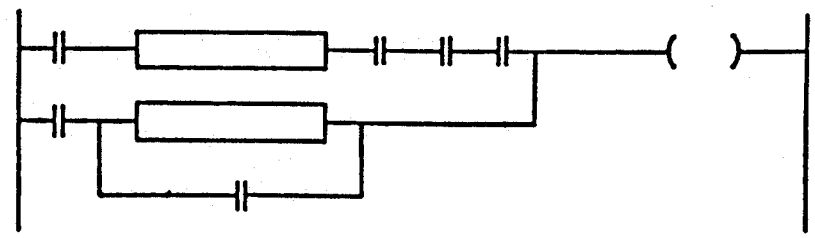

Note:
in the above, OP: operation, OC: output coil device, IC: checking input contact device, MI: manual input contact device, IP: initial position, BC: backward checking contact device, and SO: simultaneous operation Based on the operation step map of each operation block, a plurality of standardized step ladder patterns corresponding to each operation step are prepared as shown in FIGS. 21A–21C. The step ladder patterns are stored in the hard disk device 151 and the data bases for the standardized step ladder patterns are formed.

Thus, the sequence control program is formed in the form of a ladder program by the procedure as shown in a flow-chart of FIG. 22.

The formation of the sequence control program in the form of the ladder program will be explained hereinafter with reference to the flow-chart of FIG. 22.

Figure 23:
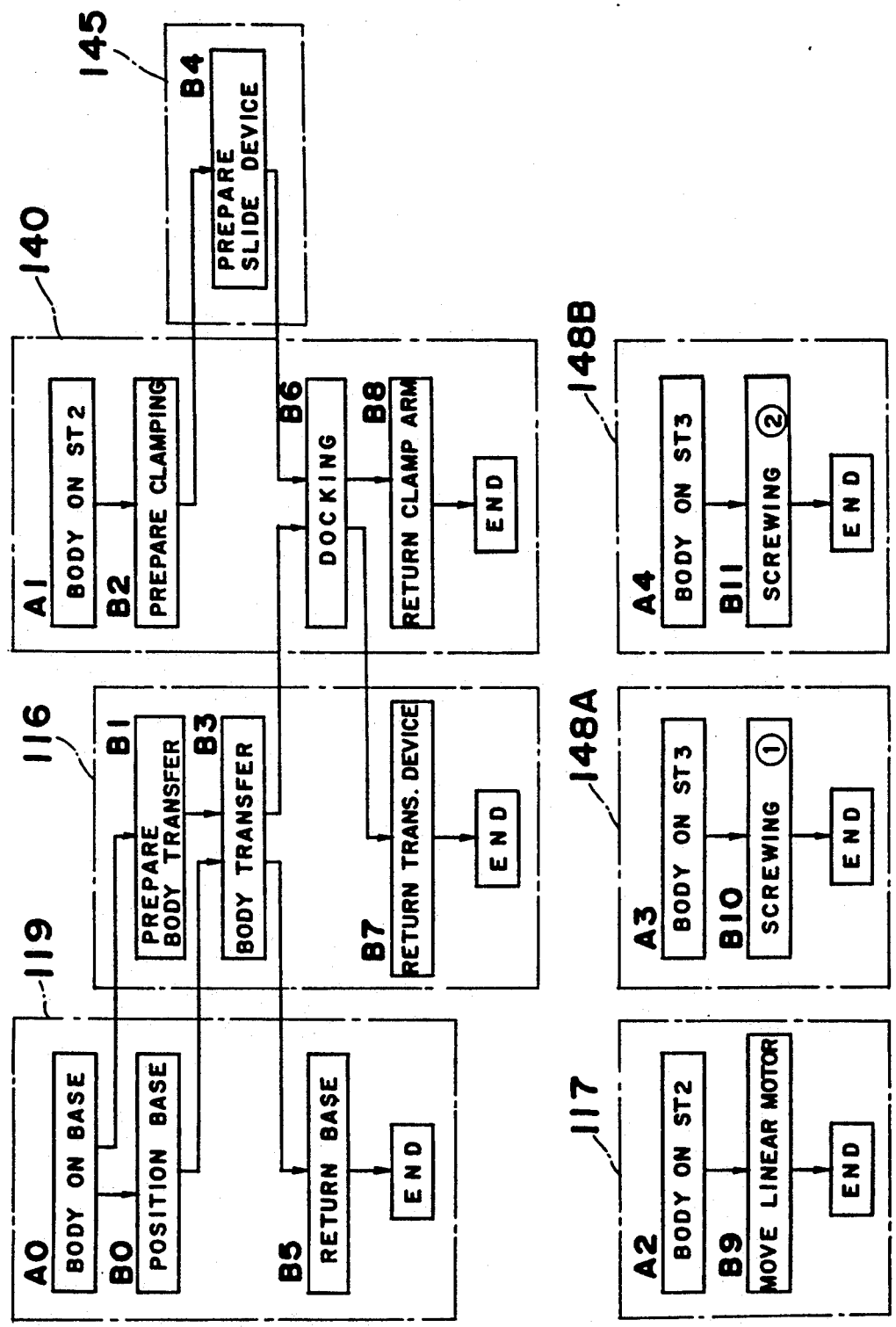
FIG. 23 is a flow-chart of operation blocks for explaining the sequence control program formed by the programming device of FIG. 20.

First, at step P1, variables m and n are set to 0. At step P2, the keyboard 167 is operated to input the data of the operation blocks B0 through B11 shown in the form of the operation block map of Table 1 and the attributes thereof. At step P3, the operation block map as shown in Table 1 formed by the CRT 166 is stored by the RAM 164. On the basis of a converted program read out from the ROM 163, the CPU 162 forms an operation block flow-chart as shown in FIG. 23 based on the data of the operation block map stored by the RAM 164. The operation block flow-chart is stored in the RAM 164.

Then, the keyboard 167 is operated to input the data of the operation steps B0S0 through B0S9 of the operation block B0 shown in the form of the operation step map of Table 3 and the attributes thereof. At step P4, the operation step map as shown in Table 3 formed by the CRT 166 is stored by the RAM 164 and similarly, the data of the operation steps of each of the operation blocks B1 through B11 and the attributes thereof are inputted. Then, the operation step map of each of the operation blocks B1 through B11 is formed and stored by the RAM 164. As a result, the RAM 164 stores the operation step map of each of the operation blocks B0 through B11.

Then, at steps P5 through P7, an operation block common step ladder pattern as shown in FIG. 21A is called out of the standardized step ladder patterns stored by the hard disk device 151 and supplied to the CPU 162. Then, the operation block flow-chart and the operation step map of the operation block B0 are read out from the RAM 164 and supplied to the CPU 162. In this condition, parameters of the actuation condition SRT of the operation block B0, the output contact device MA thereof, the stop condition STP thereof, and the output contact device MS thereof are written to the operation block common step ladder pattern. Thus, the operation block common step ladder pattern element of the operation block B0 is formed and stored by the register of the CPU 162.

An output step ladder pattern as shown in FIG. 21B is called out of the standardized step ladder patterns stored by the hard disk device 151 and supplied to the CPU 162. Then, the operation block flow-chart and the contents of the operation step B0S0 are read out from the RAM 164 based on the operation step map of the operation block B0 and supplied to the CPU 162. In this condition, according to a program read out from the ROM 163, the parameter of the operation step B0S0, the checking contact device X0, the manual contact device XA, and the output contact device Y0 are written to the output step ladder pattern. In addition, the output contact devices MA and MS and the interlock release contact device X1 are written thereto. Thus, the output step ladder element corresponding to the operation step B0S0 is automatically formed and stored by the register of the CPU 162.

Further, an output step ladder pattern as shown in FIG. 21C is called out of the standardized step ladder patterns stored by the hard disk device 151 and supplied to the CPU 162. Then, the operation block flow-chart and the contents of the operation step B0S1 are read out from the RAM 164 based on the operation step map of the operation block B0 and supplied to the CPU 162. In this condition, according to a program read out from the ROM 163, the parameter of the operation step B0S1, the checking contact device X1, the manual contact device XB, and the output contact device Y1 are written to the output step ladder pattern. In addition, the output contact devices MA and MS, the interlock release contact device X1, and the checking contact device X0 are written thereto. Thus, the output step ladder element corresponding to the operation step B0S1 is automatically formed and stored by the register of the CPU 162.

Figure 24:
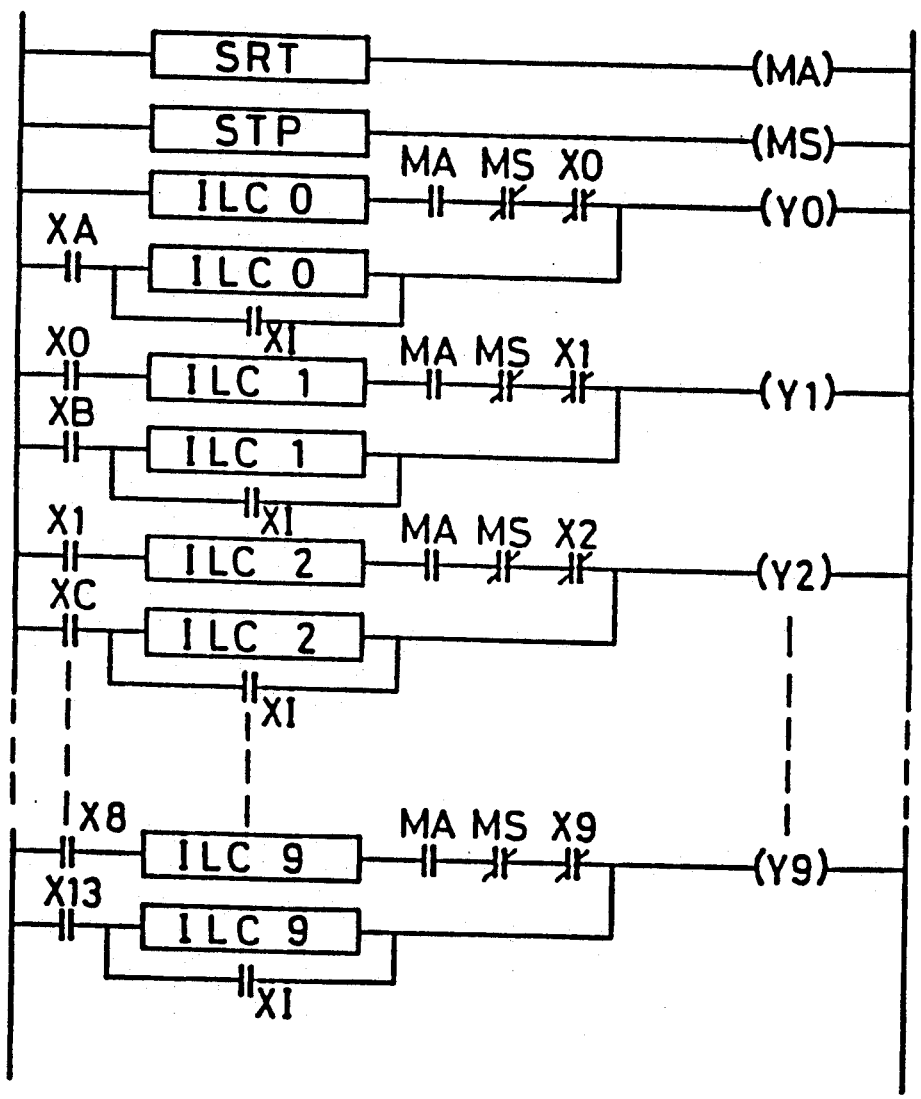
FIG. 24 is a sequence ladder diagram showing an example of the sequence control program formed by the programming device of FIG. 20.

Thereafter, output step ladder elements corresponding to the respective the operation steps B0S2 through B0S9 of the operation block B0 are sequentially automatically formed similarly to the output step ladder element corresponding to the operation step B0S1 with the variable n being incremented by one and stored by the register of the CPU 162. As a result, the ladder program of the operation block B0 a shown in FIG. 24 is formed. The above described operation are carried out at steps P8 through P12. At step P9, the variable n is reset to 0 after the output step ladder element corresponding to the operation step B0S9 is formed.

Subsequent to the operation block B0, the respective ladder programs of the operation blocks B1 through B11 are sequentially formed according to the operation block flow-chart as shown in FIG. 23 by repeating procedures similar to that employed to form the ladder program of the operation block B0 with the variable m incremented. At this time, the variable m is incremented by one. As a result, the ladder programs of the respective operation blocks B0 through B11 are sequentially linked. Thus, the sequence control ladder program for performing the sequence control over the operation of the vehicle assembling line as shown in FIGS. 18 and 19 is obtained. These operations are performed at steps P14 and P15. A determination is made at step P16 as to whether or not the sequence control ladder program thus obtained is appropriate. If an inappropriate portion is detected at step P17, the inappropriate portion is corrected. The sequence ladder program thus obtained is stored by the RAM 164 and printed out by the printer 152 as necessary.

As apparent from the foregoing description, the apparatus for automatically forming the sequence program controls sequential operations of equipment installed in a production line. The data of each operation block, the attribute thereof, each operation step of each operation block, and the attribute thereof are inputted. Thus, the step ladder elements corresponding to respective operation steps are automatically formed. Then, the respective ladder elements are sequentially linked. Thus, the sequence control program is formed. Accordingly, the number of processes for forming the sequence control program can be effectively reduced.

Described below is a system for restarting sequentially controlled equipment installed in a production line when the equipment is out of order. The equipment is restored to the normal condition after the cause of failure is removed. This system includes the aforementioned apparatus for automatically forming the sequence program.

Figure 25:
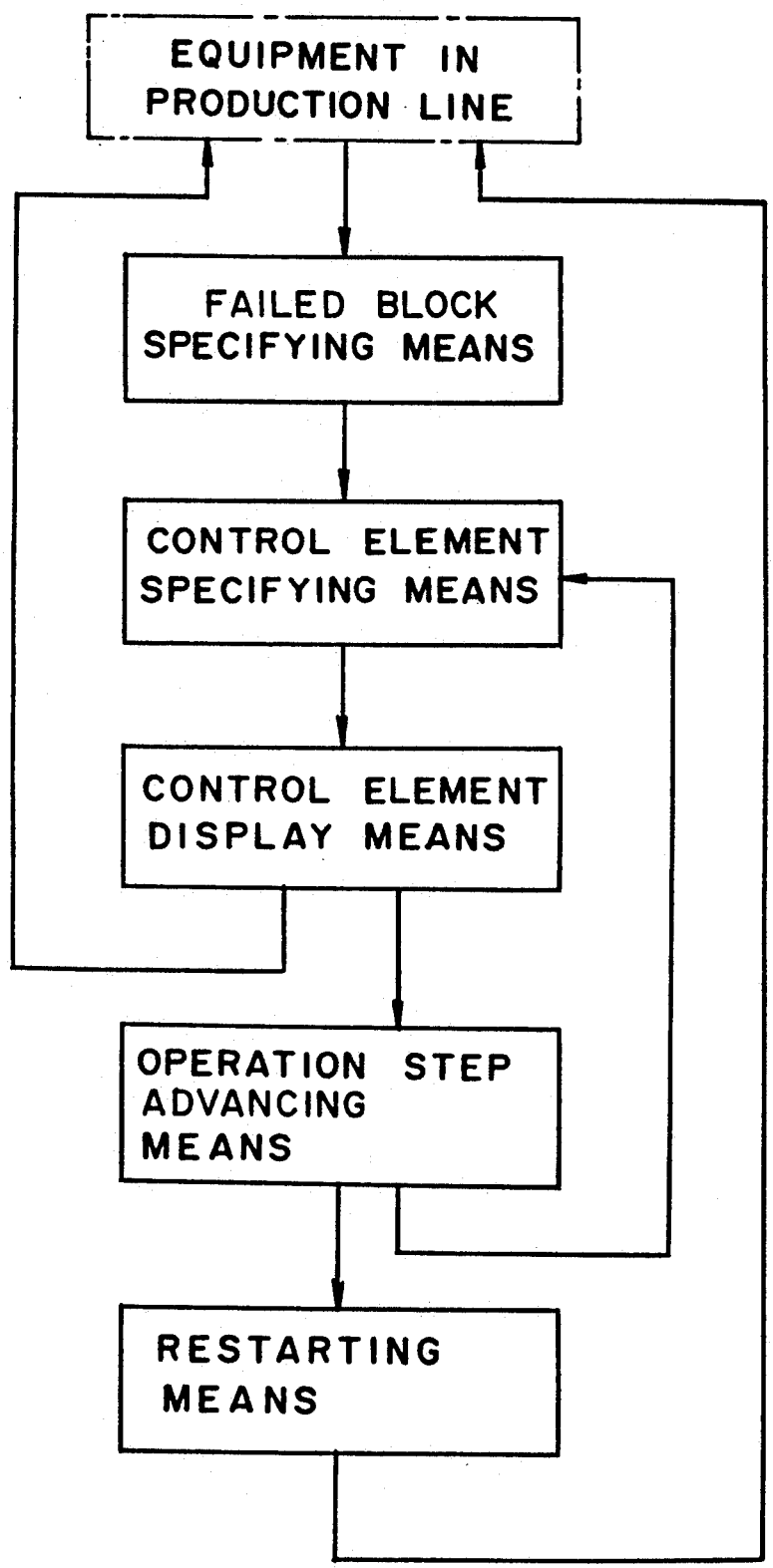
FIG. 25 is a block diagram of a system according to the present invention for restarting sequentially controlled equipment installed in a production line.

As shown in FIG. 25, the system comprises fault operation block specifying means, control element specifying means, control element displaying means, operation step advancing means, and restarting means.

When an operation element which has caused a failure is restored to the normal condition, the fault operation block specifying means specifies an operation block, which is stopped because an operation step thereof is stopped without reaching a restorable operation step, as a fault operation block. The control element specifying means specifies operation elements to be operated, which correspond to steps from the stopped operation step to the restorable operation step so that these steps may be successively advanced. The control element specifying means further specifies control elements to be manipulated t0 operate the specified operation elements. The control element displaying means displays the control elements specified by the control element specifying mean in manipulable conditions. Upon operation of such control elements, the control element specifying means causes the specified operation elements to be operated. The operation step advancing means successively advances the steps from the stopped operation step to the restorable operation step, each time the operation elements are operated so that the fault operation block may reach the restorable step. The restarting means restarts the sequence control with respect to the equipment when the fault operation block reaches the restorable operation step.

The system according to the present invention will be explained in detail hereinafter with reference to FIG. 26, in which the system is electrically connected to sequentially controlled equipment 200 through a sequence control section 201.

As described previously, the equipment includes the positioning device 119, the transfer device 116, the docking device 140, the slide device 145, the pallet transporting device 117, and the robots 148A and 148B, all of which are controlled by the sequence control section 201.

The sequence control section 201 controls the operation of the equipment 200 based on a sequence control program loaded in the sequence control section 201.

Figure 26:
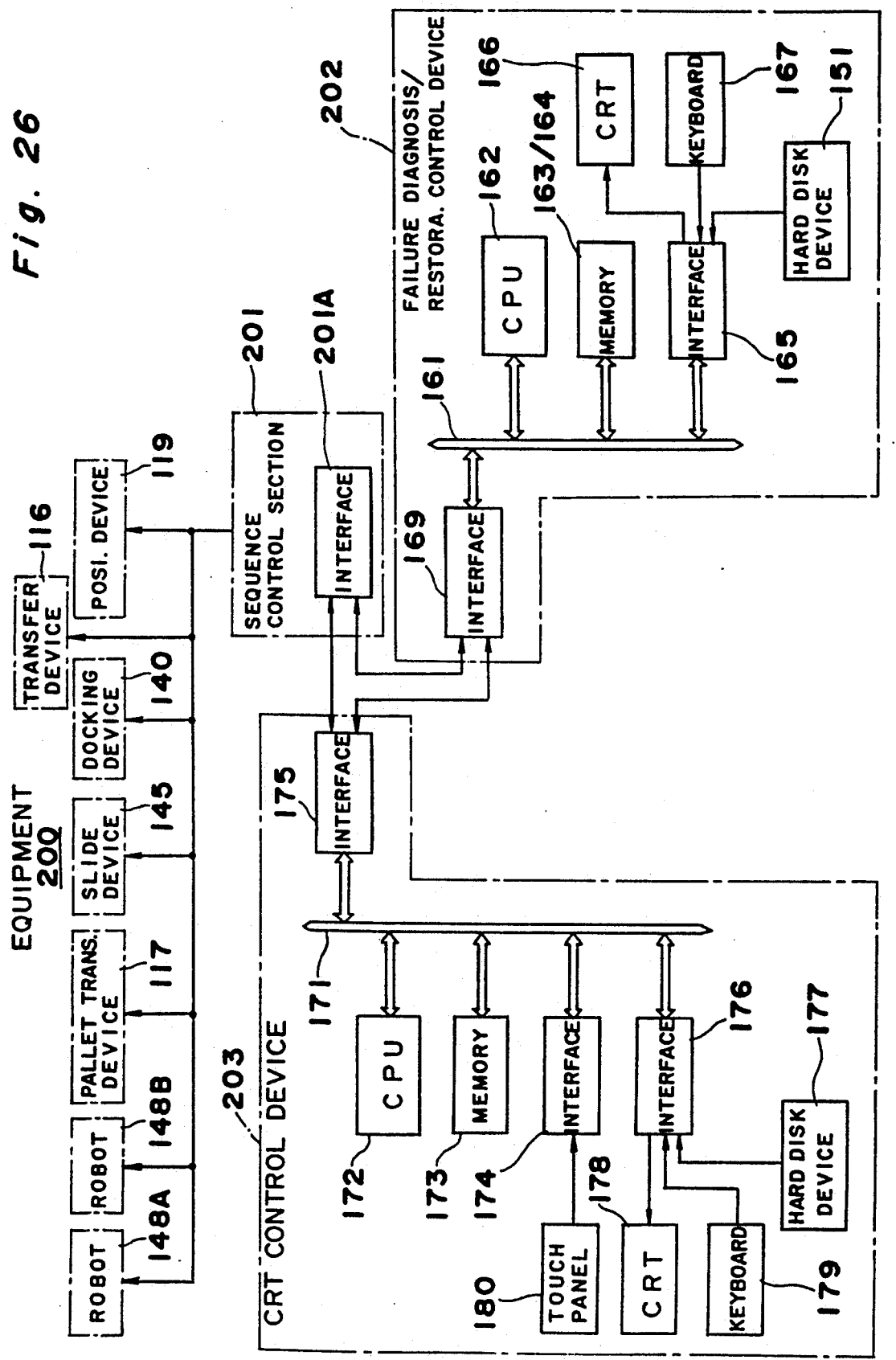
FIG. 26 is a block diagram of the system of FIG. 25, the sequentially controlled equipment and a sequence control section, all of which are electrically connected to each other.

The system according to the present invention comprises a failure diagnosis/restoration control device 202 and a CRT (cathode ray tube) control panel device 203, as shown in FIG. 26.

Figure 27:
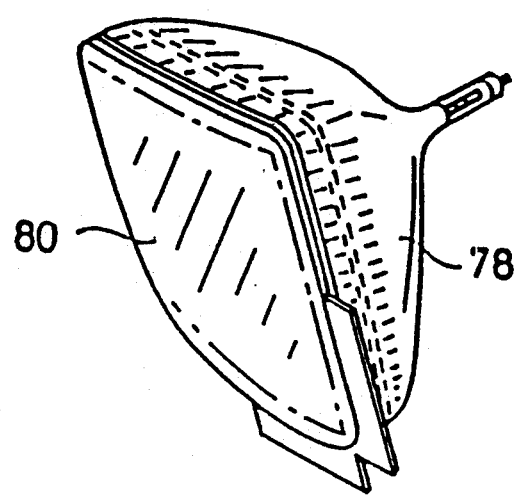
FIG. 27 is a perspective view of a CRT of a CRT control panel device provided in the system according to the present invention.

The failure diagnosis/restoration control device 202 comprises a central processing unit (CPU) 162, memories 163/164, an input/output interface (I/O interface) 165, and a transmission/reception interface 169 each connected with a bus line 161. The diagnosis/restoration control device 202 further comprises a hard disk device 151 serving as an auxiliary memory, a display CRT 166, and a keyboard 167 for inputting data and control codes connected to the I/O interface 165, respectively. The CRT control panel device 203 comprises a central processing unit (CPU) 172, memories 173, transmission/reception interfaces 174 and 175, and an input/output interface (I/O interface) 176 each connected with a bus line 171, and a hard disk device 177 serving as an auxiliary memory, a display CRT 178, and a keyboard 179 for inputting data and control codes each connected to the I/O interface 176, and a touch panel 180 connected with the transmission/reception interface 174. As shown in FIG. 27, the touch panel 180 is mounted on the outer surface of a face plate of the CRT 178. The transmission/reception interface 169 of the failure diagnosis/restoration control device 202 and a transmission/reception interface 201A of the sequence control section 201 are connected to each other. The transmission/reception interface 175 of the CRT control panel device 203 and the transmission/reception interface 201A of the sequence control section 201 are connected to each other. The transmission/reception interface 169 of the failure diagnosis/restoration control device 202 and the transmission/reception interface 175 of the CRT control panel device 203 are connected to each other.

According to the operation of the keyboard 167, program processing data received by the sequence control section 201 is transmitted to the CPU 162 of the failure diagnosis/restoration control device 202 through the transmission/reception interfaces 201A and 169. The program processing data indicates the progress state of the sequence control with respect to the equipment 200. According to a failure diagnosing program loaded, the CPU 162 checks, for example, the period of time required for each operation block of the equipment 200 to perform its operation. If a failure is detected in the equipment 200, an operation element of the equipment 200 which has caused the failure is checked. Then, a failure diagnosis to repair the operation element is carried out. After the failure operation element is recovered from the failure, a control is performed to restore the equipment 200 to the condition in which the sequence control section 201 can sequentially control the operation of the equipment 200. The hard disk device 151 stores data indicating each step ladder element of the sequence control ladder program loaded in the sequence control section 201 so that the data is individually read out. That is, the hard disk device 151 makes a data base for the sequence control ladder program.

Figure 28:
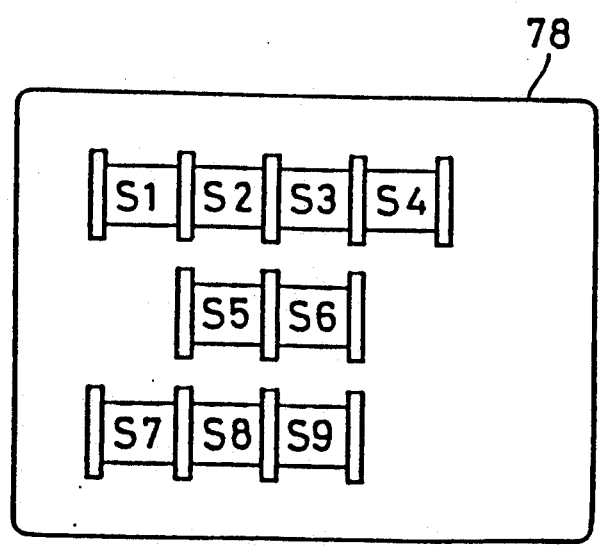
FIG. 28 is a plan view of a face plate of the CRT of FIG. 27.

The CRT control panel device 203 generates a signal according to the touched position of the touch panel 180 mounted on the outer surface of the face plate of the CRT 178. As shown in FIG. 28, any of a plurality of control panels each having a control element such as a switch arranged on the face plate of the CRT 178 is selectively displayed. When an operator touches a certain position of the touch panel 180 corresponding to a selected control element of the control panel displayed on the face plate of the CRT 178, a signal outputted from the touch panel 180 is supplied to the CPU 172 through the transmission/reception interface 174 as an input signal indicative of the manipulation of the selected control element of the control panel. The hard disk device 177 stores data indicative of a plurality of control panels to be selectively displayed on the face plate of the CRT 178. In addition to the control panels, the face plate of the CRT 178 selectively displays an illustration of an operated portion of the equipment 200. The hard disk device 177 stores data to be used for the illustration. Thus, the hard disk device 177 makes a data base. A signal outputted in response to the touch on the touch panel 180 is supplied to the CPU 172 through the transmission/reception interface 174 and to the sequence control section 201 from the transmission/reception interface 175 through the transmission/reception interface 201A. Thus, the operation elements of the equipment 200 is controlled.

As described above, in the control input section comprising the CRT 178 and the touch panel 180, each time a selected control panel is displayed on the face plate of the CRT 178, the relationship between the position on the control panel displayed on the face plate of the CRT 178 and that on the touch panel 180 is set.

When a failure occurs in the equipment 200 controlled by the system having the above-described construction, operations are carried out to restore the fault equipment 200 to the condition in which it is appropriately sequentially controlled.

Figure 29:
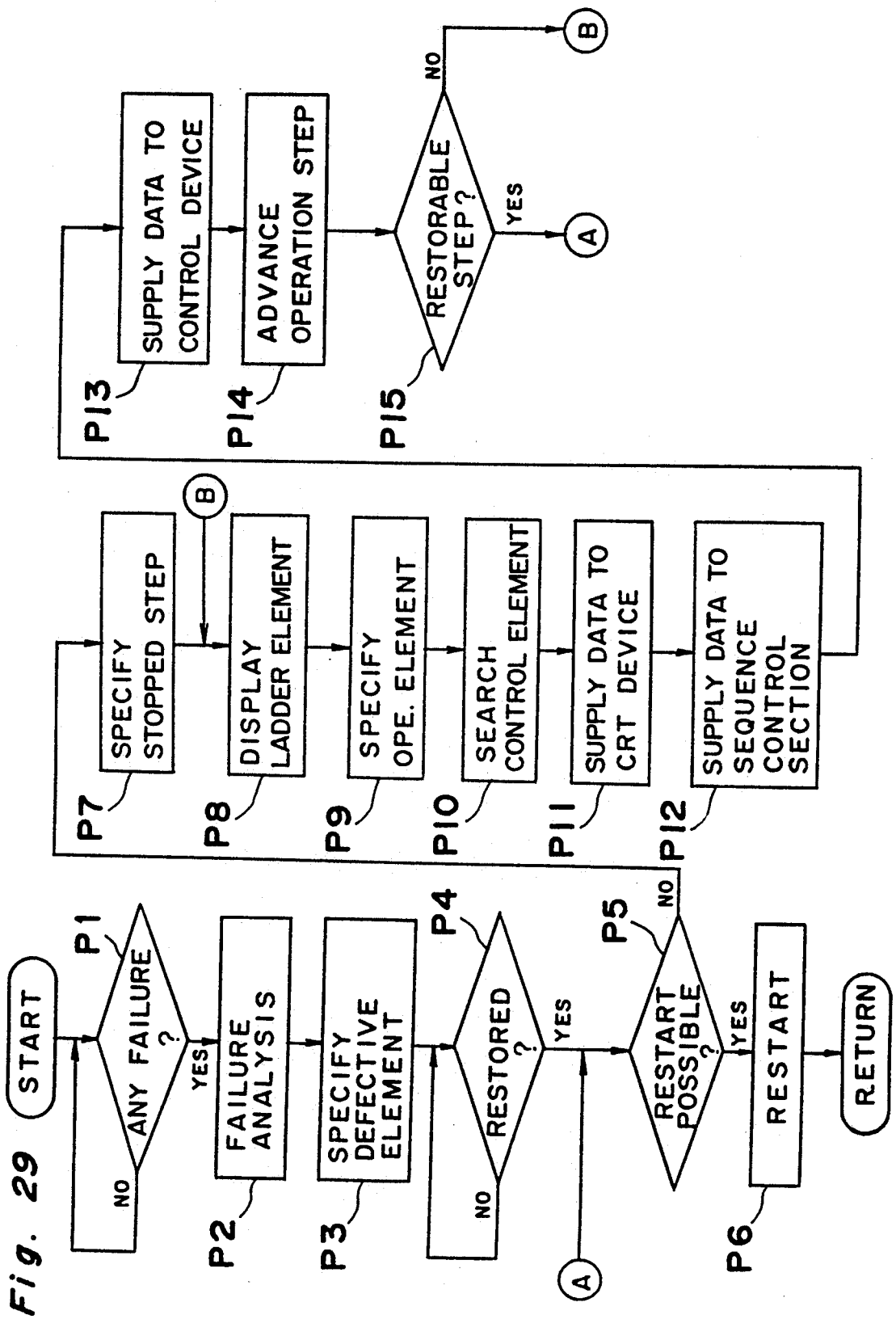
FIGS. 29 and 30 are flowcharts for indicating the method according to the present invention.

The process for restoration will be described with reference to a flow-chart shown in FIG. 29.

First, at step P1, a determination is made by the failure diagnosis/restoration control device 202 as to whether or not a failure has occurred in the equipment 200. If yes, a failure diagnosis is executed at step P2. At step P3, a failure operation block is specified from the plurality of operation blocks shown by the operation block flow-chart of FIG. 23 and a failure operation step is specified from the plurality of operation steps of the specified operation block. Thus, the defective operation element which has caused the failure is specified.

At step P4, the failure diagnosis/restoration control device 202 gives an advice about the restoration of the defective operation element, then, the restoration of the defective operation element is required. After the defective operation element is repaired, at step P5, a determination is made as to whether or not all of the operation blocks shown by the flow-chart of FIG. 23 have reached the operation step B999 shown in Table 3, namely, a determination is made as to whether or not they are in the restorable operation step and whether or not the sequence control section 201 can be restarted. If yes, the sequence control is restarted at step P6. If all of the operation blocks have not reached the restorable operation step, i.e., if the sequence control for the equipment 200 cannot be restarted at step P7, the failure diagnosis/restoration control device 202 is switched to the restoring control mode so as to specify an operation block which has not returned to the restorable condition from the plurality of the operation blocks. Furthermore, a stopped operation step is selectively specified from the plurality of the operation steps of the specified operation block.

Thereafter, at step P8, data indicating the step ladder element corresponding to the stopped operation step specified by the hard disk device 151 is read out, then, the face plate of the CRT 166 displays the step ladder element corresponding to the stopped operation step after the CRT 166 prepares for the display based on the data read out. At step P9, a step ladder element displayed on the face plate of the CRT 166 is analyzed, and an operation element of the stopped operation step is specified so that the sequence control proceeds to the next operation step. At step P10, a control element to be manually operated is searched to operate the specified operation element of the stopped operation step.

At step P11, data indicating the control element thus searched is transmitted from the failure diagnosis/restoration control device 202 through the transmission/reception interface 169 thereof to the CRT control panel device 203 through the transmission/reception interface 175 thereof. In the CRT control panel device 203 to which the data indicative of the control element is supplied from the failure diagnosis/restoration control device 202, the hard disk device 177 reads out the data corresponding to a control panel including the control element displayed by the data indicative of the control element and the data thus read out is supplied to the CRT 178, and the control panel indicated by the data is displayed on the face plate of the CRT 178. Thereafter, of control elements of the control panel displayed on the face plate of the CRT 178, the operator selects a position of the touch panel 180 corresponding to the control element indicated by the data supplied from the failure diagnosis/restoration control device 202. Thus, at step P12, a signal generated by such manipulation of the control element indicated by the data transmitted from the failure diagnosis/restoration control device 202 is outputted from the touch panel 180 through the transmission/reception interface 174. The signal is supplied from the transmission/reception interface 175 of the CRT control panel device 203 to the sequence control section 201 through the transmission/reception interface 201A thereof. Consequently, at step P13, the specified operation element of the equipment 200 is operated by the sequence control section 201 and data indicating that the specified operation element has been operated is supplied from the transmission/reception interface 201A of the sequence control section 201 to the failure diagnosis/restoration control device 202 through the transmission/reception interface 169.

At step P14, in the failure diagnosis/restoration control device 202 to which the data is supplied from the sequence control section 201, a control for operating the operation step subsequent to the stopped operation step is executed. Then, at step P15, a determination is made as to whether or not the operation step subsequent to the stopped operation step is the operation step B999 of Table 3, namely, the restorable operation step. If no, the operation step subsequent to the stopped operation step is specified as the operation step to be advanced and again, data indicating the step ladder element corresponding to the specified operation step is read out from the hard disk device 151. Then, a preparation for making a display, based on the data read out, on the CRT 166 is carried out. Then, operations subsequent to the operation displayed on the face plate of the CRT 166 based on the data indicating the step ladder element corresponding to the specified operation step are sequentially effected. Thus, these operations are repeated until the restorable operation step is specified. When the restorable operation step is specified, a determination is made as to whether or not the operation blocks shown by the flow-chart of FIG. 23 are all in restorable operation steps. The above operations are repeatedly performed until the sequence control is restarted by the sequence control section 201.

Figure 30:
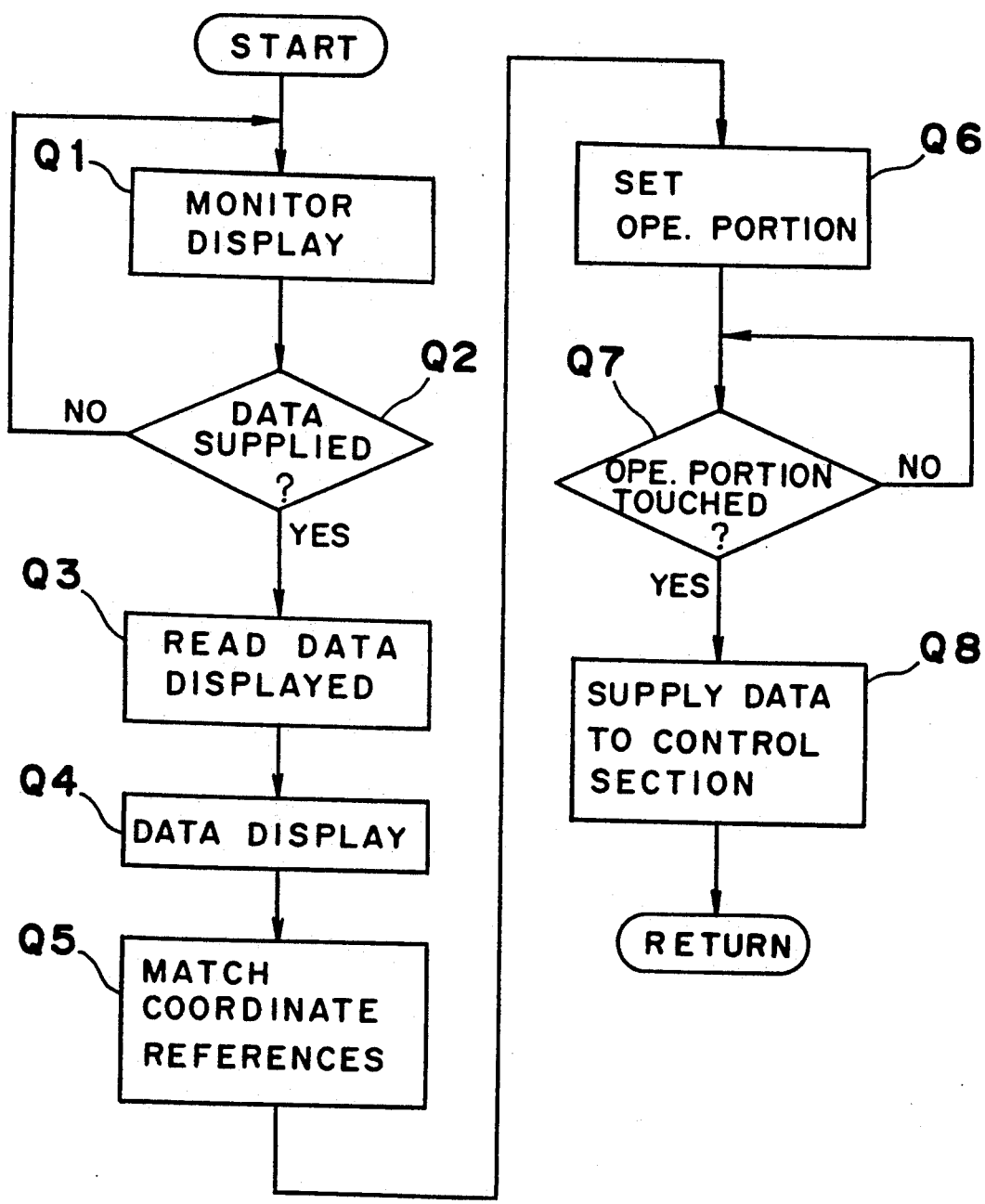

Referring to a flow-chart shown in FIG. 30, a description follows on the operation which is performed by the CRT control panel device 203 when the failure diagnosis/restoration control device 202 carries out the failure diagnosis and the restoration control.

First, at step Q1, display data of an illustration showing the operated portion of the equipment 200 is read out from the hard disk device 177, if it has been determined by the failure diagnosis/restoration control device 202 that no failure has occurred in the equipment 200. The CRT 178 then prepares for a display based on the data read out and execute the operation monitor display of the operated portion. At step Q2, similarly to the above-described manner, it is repeatedly determined whether or not data of the control element to be manipulated to operate the specified operation element has been supplied until it is determined that the data has been supplied.

When it is determined that the data of the control element is supplied, display data corresponding to the control panel including the control element indicated by the data of the control element is read out from the hard disk device 177 at step Q3, and then, the display data is supplied to the CRT 178. Consequently, at step Q4, the control panel including the control element indicated by the data of the control element is displayed on the face plate of the CRT 178. At step Q5, the coordinate reference of the display on the face plate of the CRT 178 is matched with that on the touch panel 180. At step Q6, of the plurality of control elements displayed on the face plate of the CRT 178, the position, of the face plate of the CRT 180, corresponding to the control element indicated by the data supplied from the failure diagnosis/restoration control device 202 is set as a specified contact region, of the touch panel 180, for generating a signal corresponding to the manipulation of the control element indicated by the data supplied from the failure diagnosis/restoration control device 202.

Thereafter, a determination is made at step Q7 as to whether or not the operator has touched the specified contact region. If it is determined at Q7 that the operator has touched it, at step Q8, a signal produced by the touch panel 180 in response to the touch of the specified contact region is supplied to the sequence control section 201 through the transmission/reception interface 175 and the transmission/reception interface 201A as an input corresponding to the manipulation of the control element indicated by the data transmitted from the failure diagnosis/restoration control device 202. Thereafter, a determination is made as to whether or not the failure diagnosis/restoration control device 202 has supplied, to the CRT control panel device 203, data indicating a control element to be manipulated to operate a specified operation element until it is determined that the data of the control element is supplied.

As apparent from the foregoing, when a failure occurs in the equipment, the system according to the present invention can promptly restore the equipment with easy manipulation to the normal condition, in which the operations of the equipment are appropriately sequentially controlled, after the cause of the failure is eliminated. Consequently, the equipment can continue its operation with a small amount of damage.

Although the present invention has been fully described in connection with the preferred embodiments thereof with reference to the accompanying drawing, it is to be noted that various changes and modifications are apparent to those skilled in the art. Such changes and modifications are to be understood as included within the scope of the present invention as defined by the appended claims unless they depart therefrom.

What is claimed is:

1. A method of restarting sequentially controlled equipment installed in a production line when the equipment is out of order, said method comprising the steps of:
   dividing operations of said equipment into a plurality of operation blocks, operations in each operation block being executed independently of operations in any other block;
   dividing each of said operation blocks into one or a series of operation steps to be sequentially executed in a predetermined order under a normal condition;
   setting in each operation block at least one home position from which the equipment can be restarted;
   determining if an abnormality indicating a failure has occurred by calculating an operation period of time from beginning to end of sequential operations of the operations steps in each block and by comparing said operation period of time with a reference period of time, which is updated for each cycle of the sequential operations of the operations steps in each block by being newly calculated for each step; and
   restoring an output element, which has caused a failure and is now stopped, to the home position after a cause of the failure is removed.

2. The method according to claim 1, wherein said home position of each operation block is set to a position from which the operation block can be restarted after the cause of the failure is removed.

3. The method according to claim 2, wherein said home position is set to a terminal operation step of each operation block at which the operations of the operation block is terminated.

4. The method according to claim 2, wherein said home position is set to an initial operation step of each operation block from which the operations of the operation block is started.

5. The method according to claim 1, further comprising the step of restarting a sequence control with respect to the equipment.

6. The method according to claim 1, further comprising the step of specifying an operation step which has caused failure as a fault operation step, the step of specifying an operation block including the fault operation step as a fault operation block, and the step of restoring the fault operation step to the home position.

7. The method according to claim 6, further comprising the step of specifying operation elements to be operated so that operation steps from the fault operation step to the home position are successively advanced, and the step of restarting a sequence control with respect to the equipment after the fault operation block reaches the home position by successively operating the operation elements to be operated.

8. The method according to claim 7, further comprising the step of specifying control elements to be manipulated for operation of the operation elements, and the step of displaying each specified control element under an operable condition in which the specified control element is made operable.

9. The method according to claim 1, wherein said reference period of time is determined by a mean value of measured operation periods of time in a predetermined number of cycles under the normal condition and a standard deviation value.

10. A system for restarting sequentially controlled equipment installed in a production line when the equipment is out of order, said system comprising:
   fault operation block specifying means for specifying an operation block, as a fault operation block, which is stopped at the time an operation step thereof is stopped without reaching a restorable operation step from which the equipment can be restarted after an operation element which has caused a failure is restored to a normal condition;
   control element specifying means for specifying operation elements to be operated so that steps form the fault operation step to the restorable operation step is successively advanced and for specifying control elements to be manipulated to operate the specified operation elements;
   control element displaying means for displaying each control element specified by the control element specified means in an operable condition in which the specified control element is made operable so that the control element specifying means causes the specified operation element to be operated by manipulating the control element;
   a determination means for determining if an abnormality indicating a failure has occurred by calculating an operation period of time from beginning to end of sequential operations of the operations steps in each block and by comparing said operation period of time with a reference period of time, which is updated for each cycle of the sequential operations of the operations steps in each block;

operation step advancing means for successively advancing the steps from the fault operation step to the restorable operation step, each time the operation elements are operated so that the fault operation block reaches the restorable step; and restarting means for restarting a sequence control with respect to the equipment when the fault operation block reaches the restorable operation step.

11. The system according to claim 10, wherein said reference period of time is determined by a mean value of measured operation periods of time in a predetermined number of cycles under the normal condition and a standard deviation value.

* * * * *